(12) United States Patent
Charles et al.

(10) Patent No.: US 6,340,124 B1
(45) Date of Patent: Jan. 22, 2002

(54) HOUSEHOLD ELECTRIC COOKING APPLIANCE, SUCH AS A FOOD PROCESSOR, COMPRISING A SIMPLIFIED LOCKING AND UNLOCKING DEVICE

(75) Inventors: Patrick Charles, Louey; Robert Smit, Lourdes; Jean-Luc Bordes, Ade; Pierre Bineau, Asson; Philippe Gaudez, Lyons; Manuel Jurado, Lons, all of (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/509,894

(22) PCT Filed: Oct. 2, 1998

(86) PCT No.: PCT/FR98/02115

§ 371 Date: Apr. 3, 2000

§ 102(e) Date: Apr. 3, 2000

(87) PCT Pub. No.: WO99/17647

PCT Pub. Date: Apr. 15, 1999

(30) Foreign Application Priority Data

Oct. 3, 1997 (FR) .............................. 97 12566
Oct. 3, 1997 (FR) .............................. 97 12569

(51) Int. Cl.[7] ........................ B02C 25/00; D47J 43/046
(52) U.S. Cl. .................................. 241/37.5; 241/282.1
(58) Field of Search ................ 241/92, 282.1, 241/282.2, 155.12, 36, 37.5

(56) References Cited

U.S. PATENT DOCUMENTS 3,101,107 A * 8/1963 Posener et al. ............ 241/37.5

FOREIGN PATENT DOCUMENTS

| CH | 254 203 | 12/1948 |
| DE | 896 409 | 7/1949 |
| DE | 33 27 439 | 2/1985 |
| DE | 295 10 989 | 11/1995 |
| EP | 491 324 | 6/1992 |
| EP | 549 818 | 7/1993 |
| WO | 92/03080 | 3/1990 |

* cited by examiner

Primary Examiner—Mark Rosenbaum
(74) Attorney, Agent, or Firm—Browdy and Neimark

(57) ABSTRACT

Electrical household appliance for culinary preparation, of the food processor type having a body forming a base to receive a working receptacle in which can be disposed a rotatable working element driven by a motor disposed in the body, a lid to close the working receptacle, and a mechanism for locking the lid on the working receptacle. The mechanism has jaws movably mounted on the body between a locking position in which they engage the lid to block it vertically and an unlocking position in which the lid can be withdrawn, these jaws being movable against at least one restoring member toward one of the two positions. The appliance further has an unlocking mechanism movably mounted on the body between a rest position in which the jaws are able to lock the lid on the receptacle, and an active position in which the jaws are brought into their unlocking position.

20 Claims, 15 Drawing Sheets

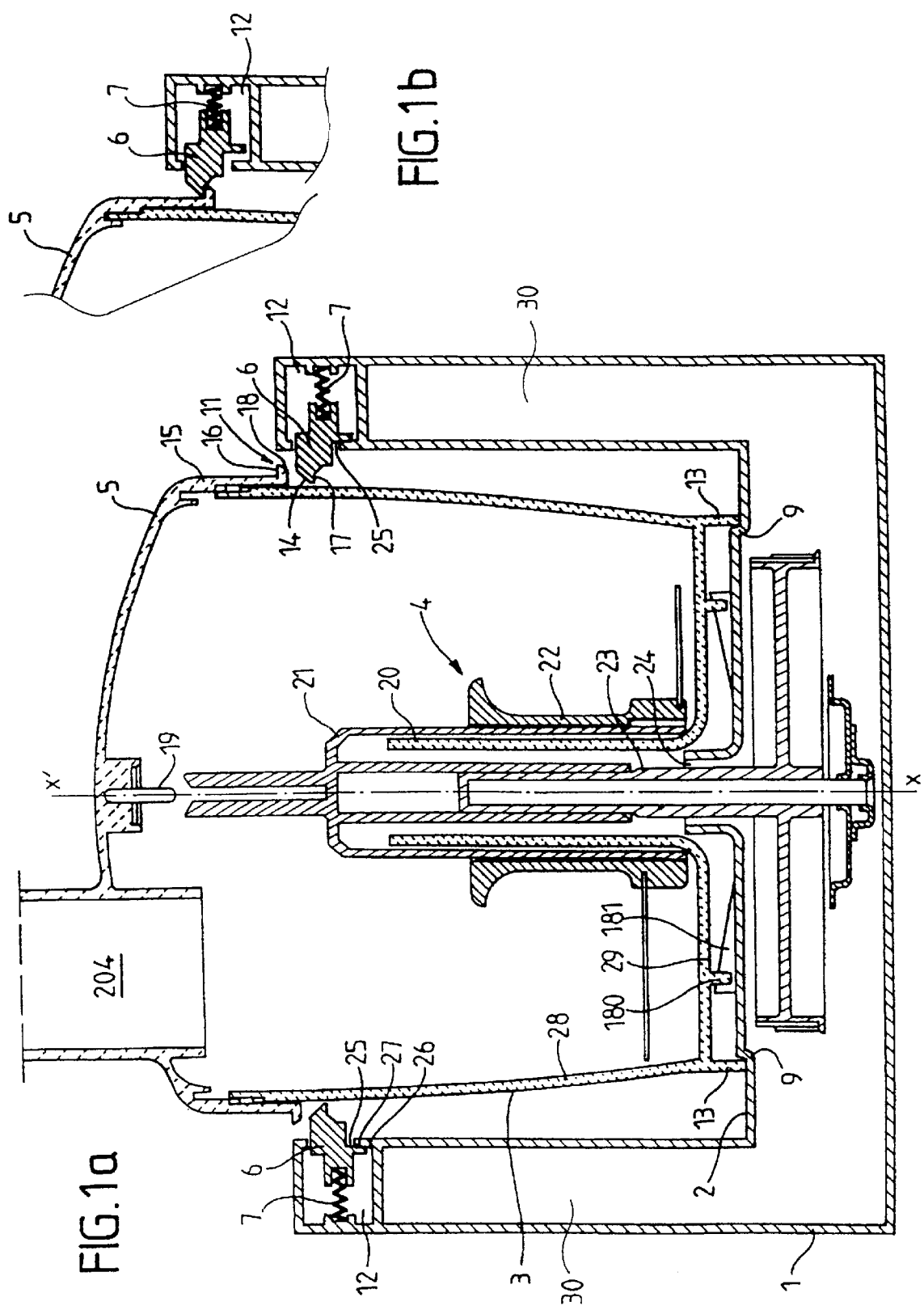

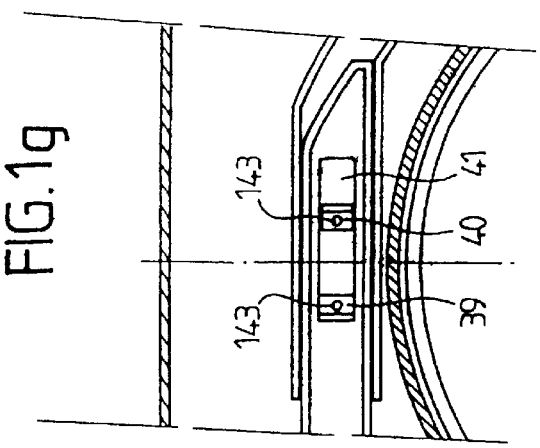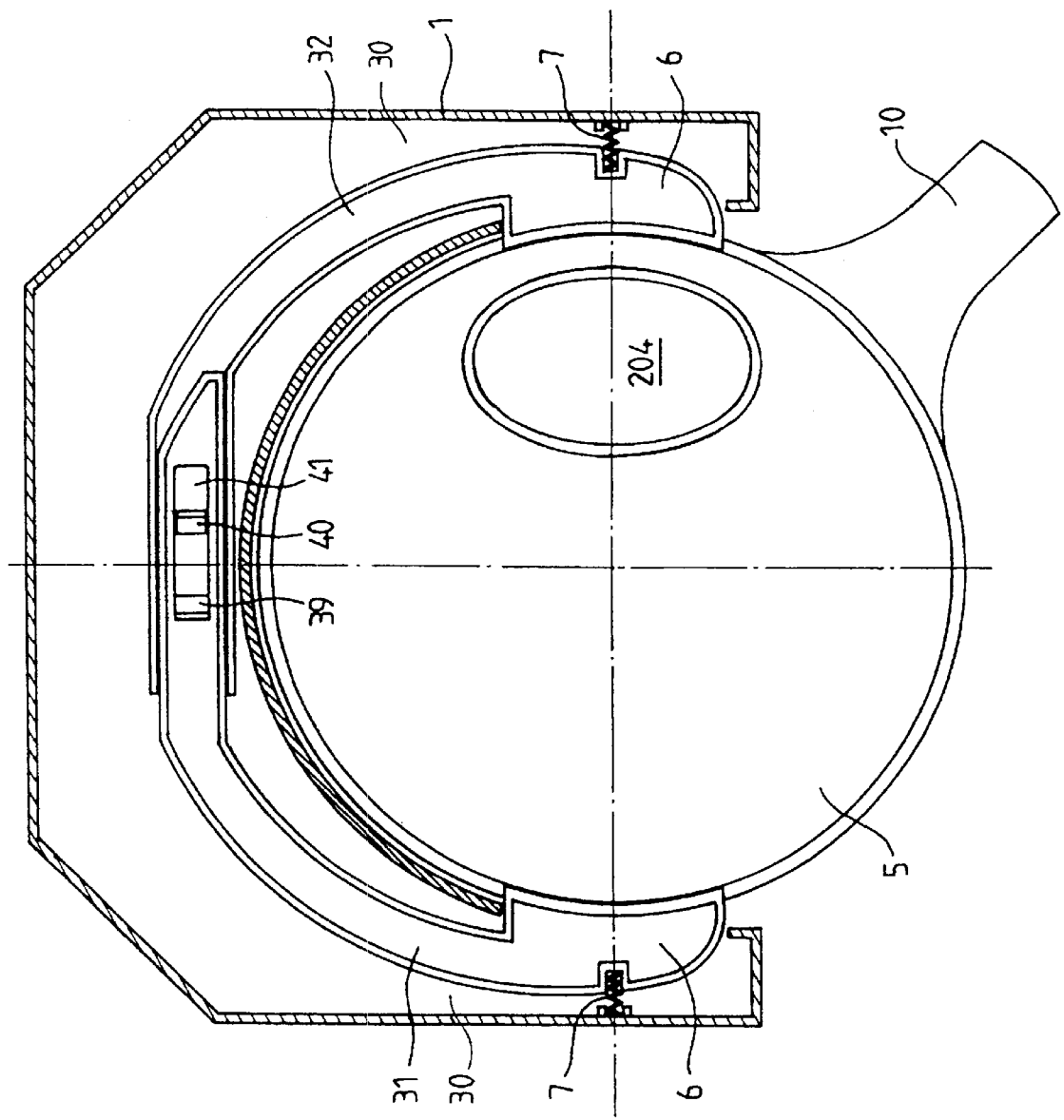

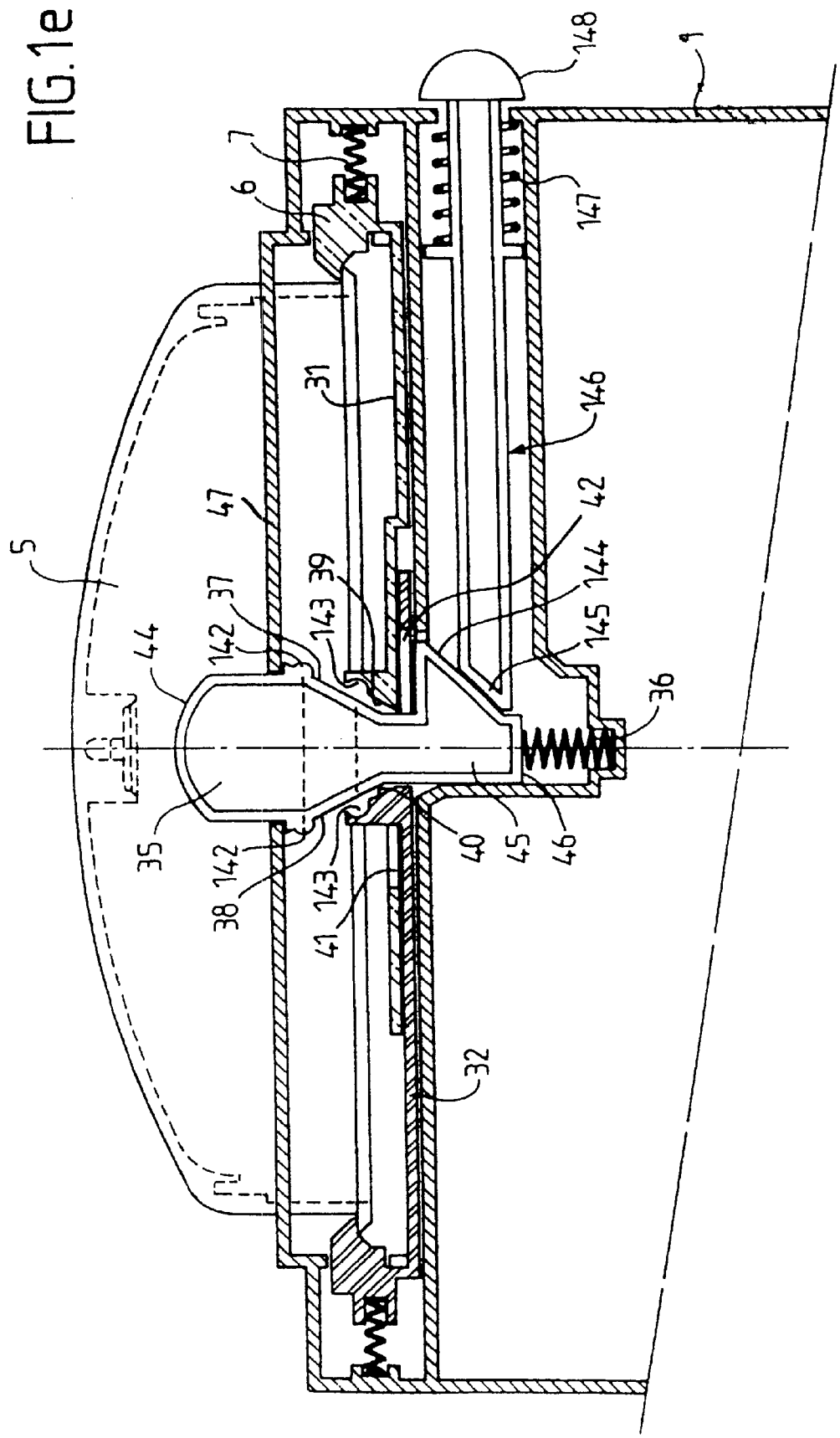

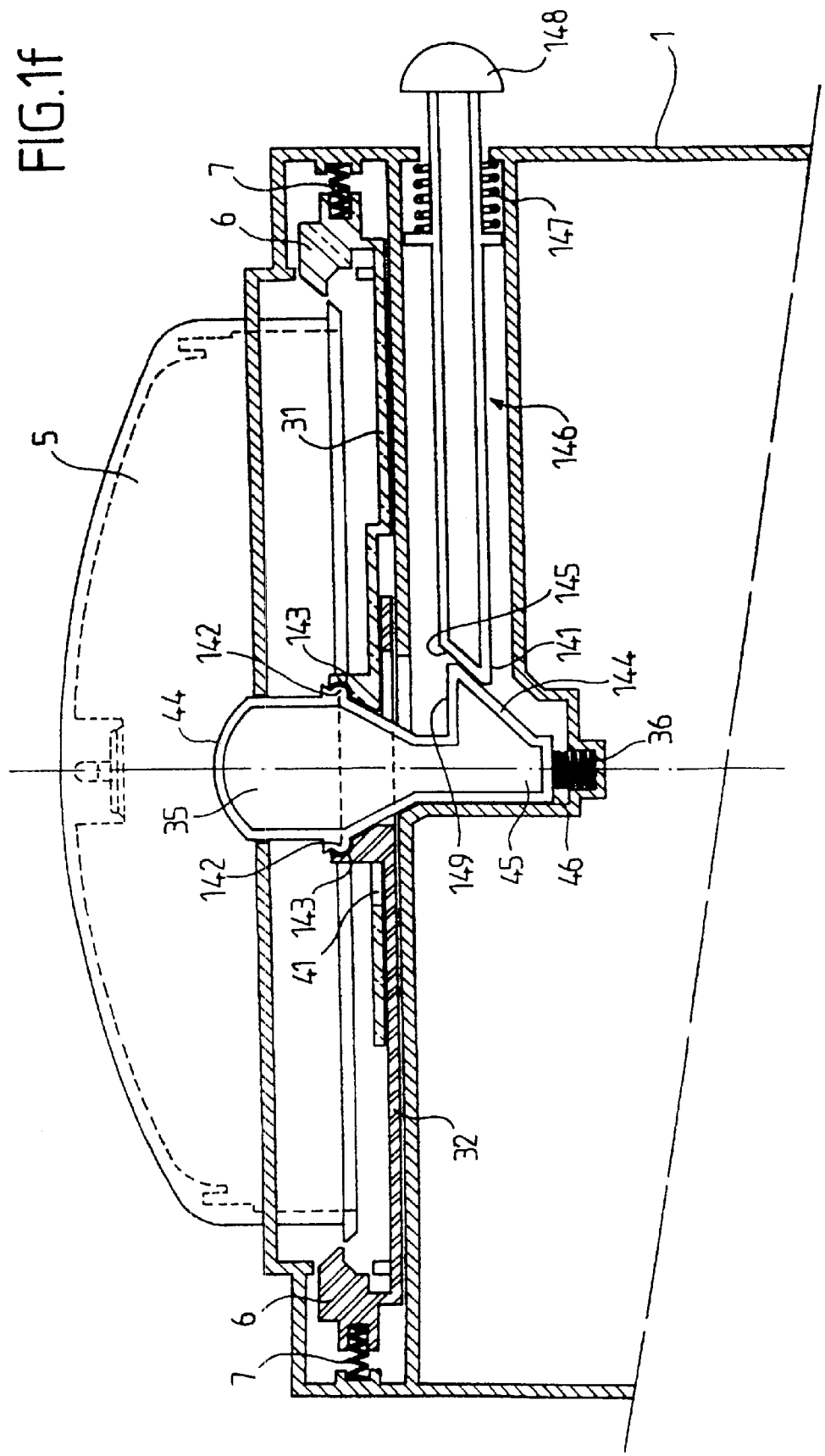

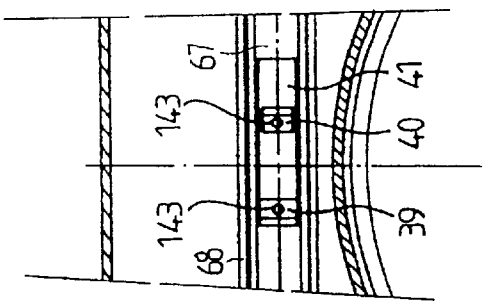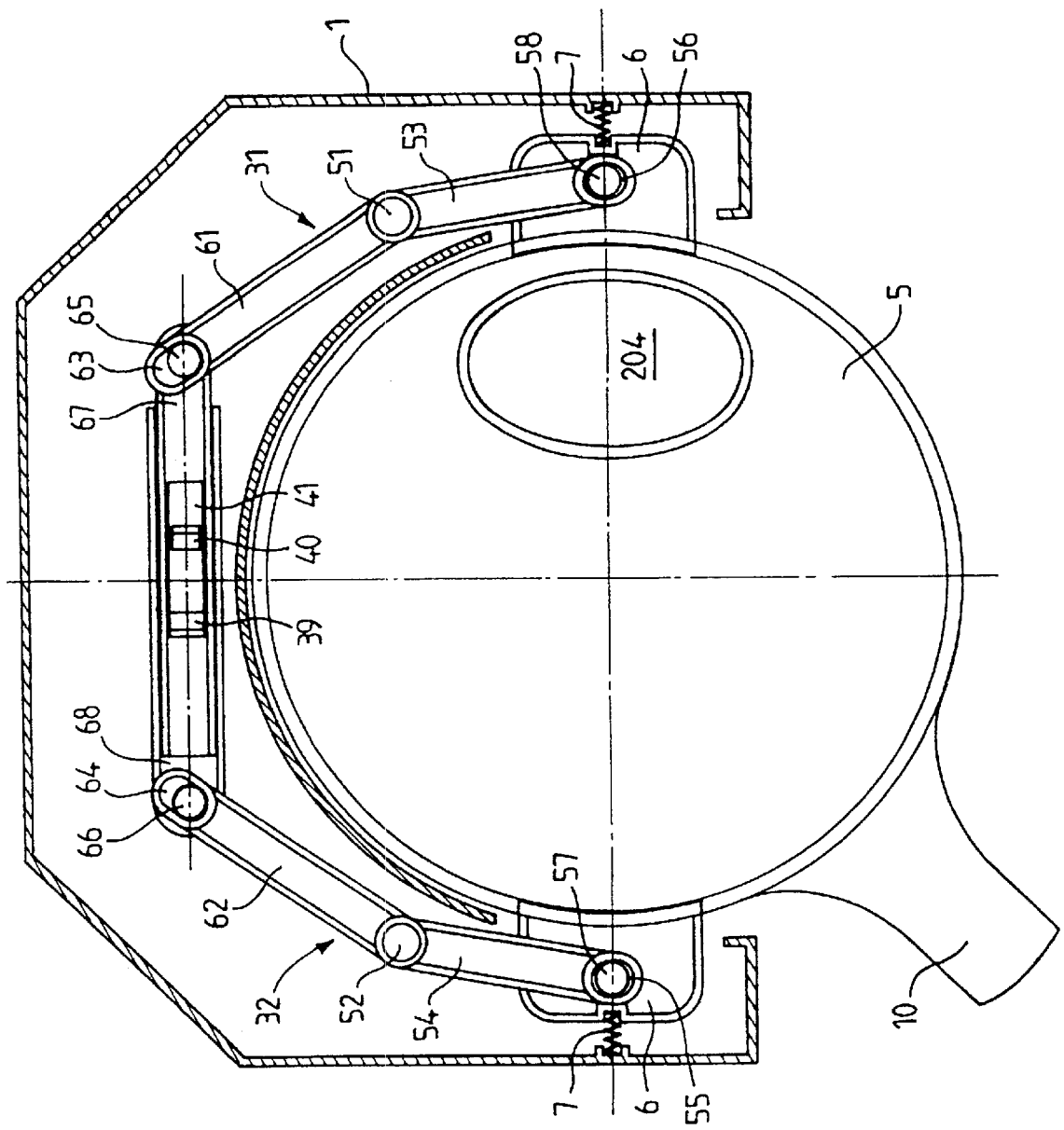

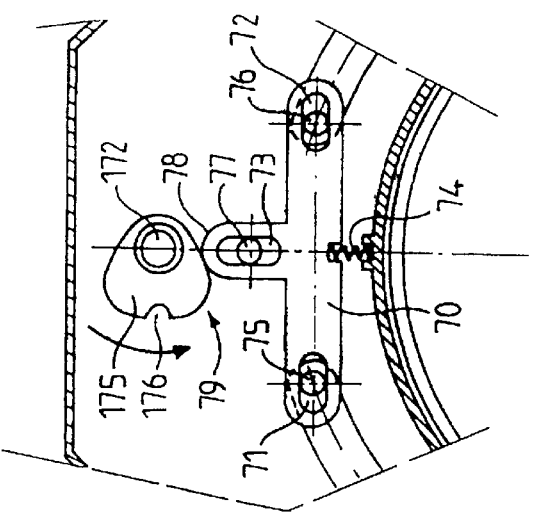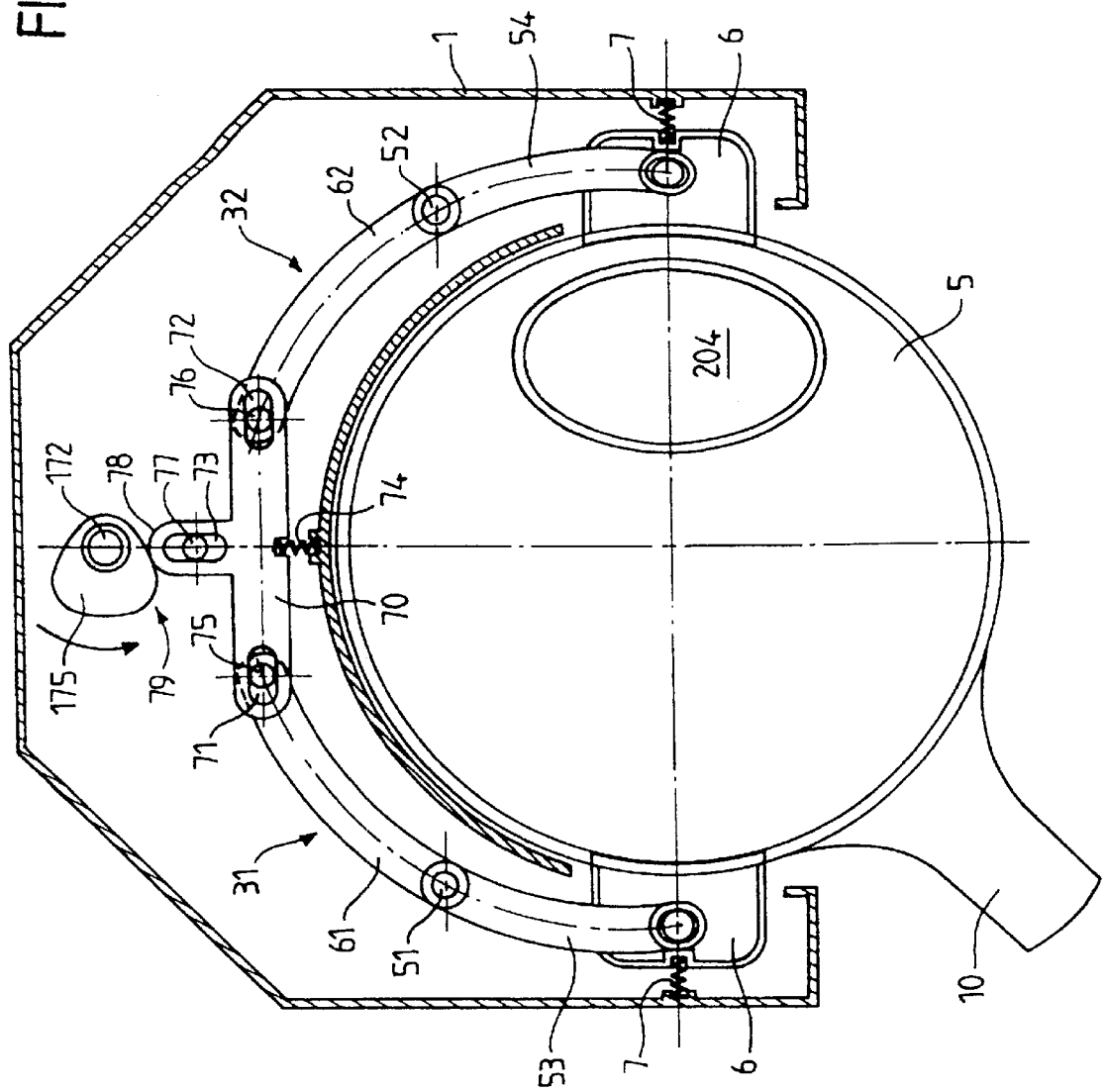

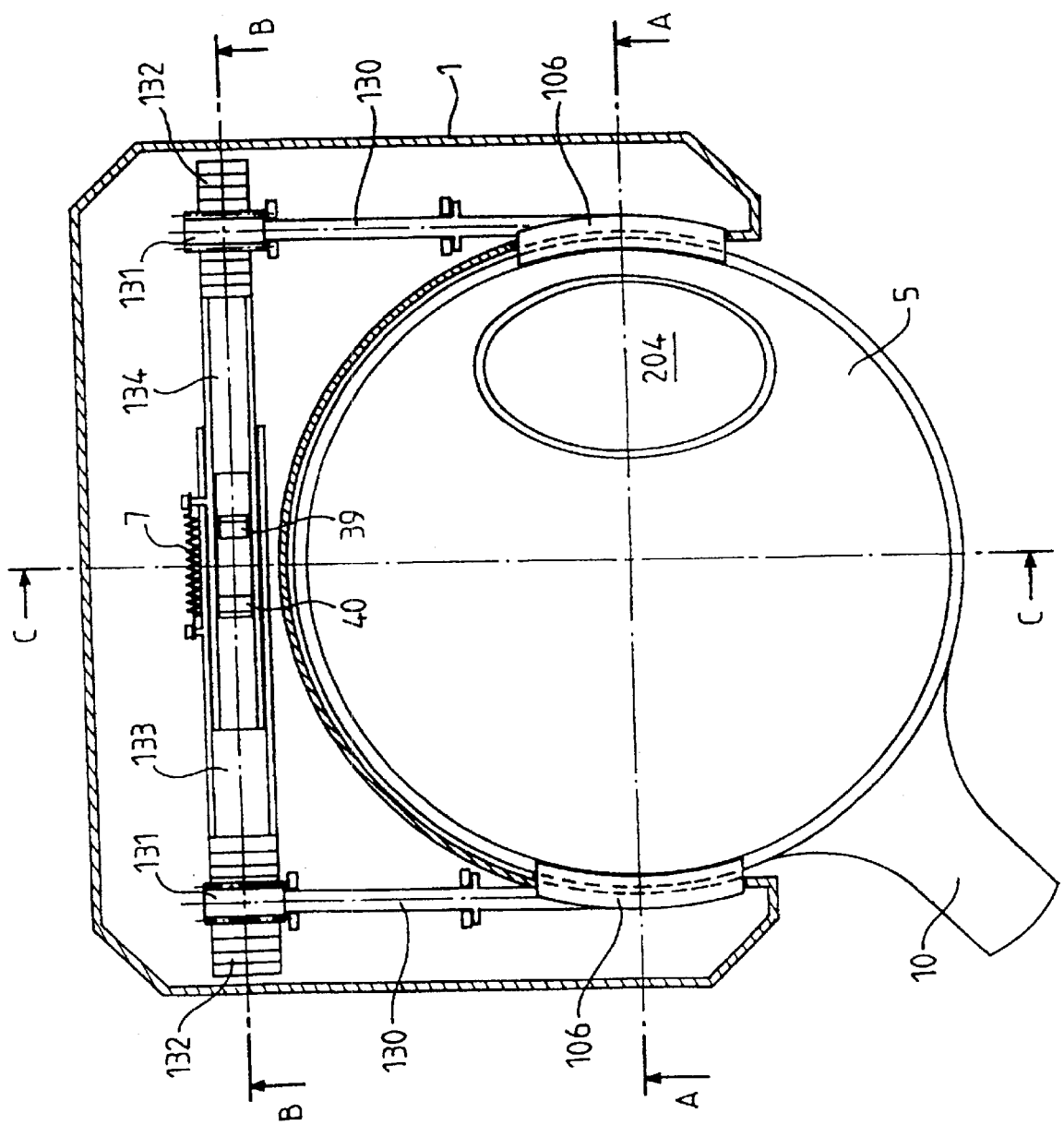

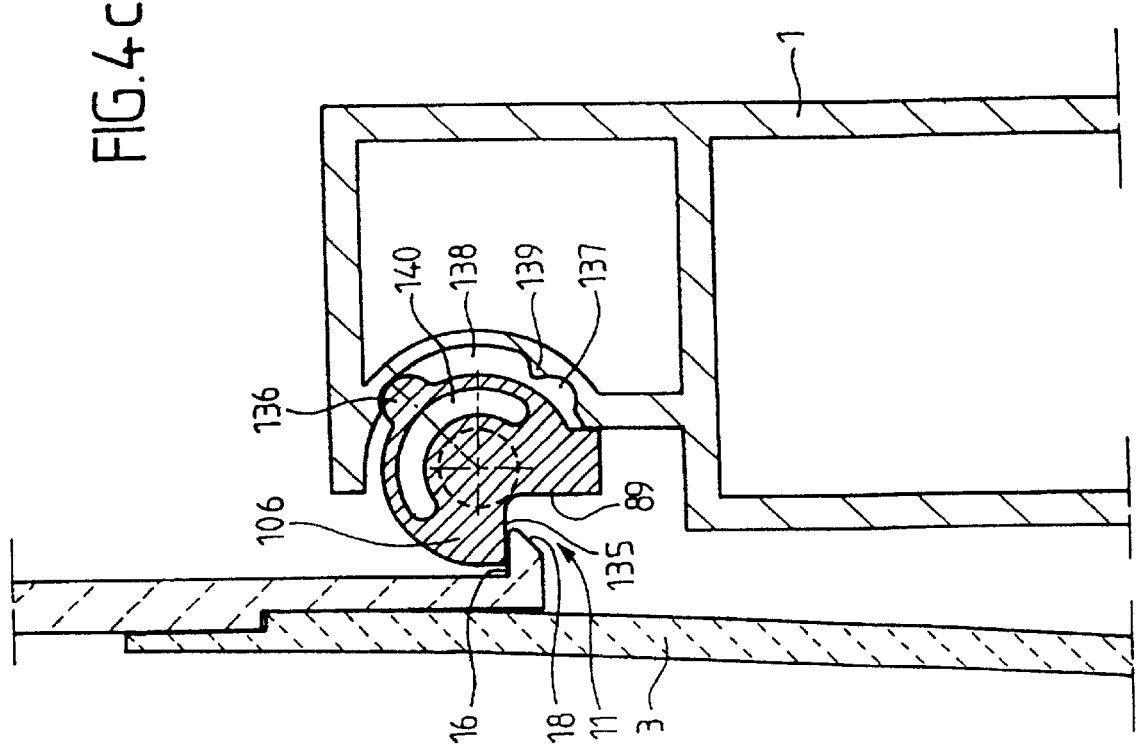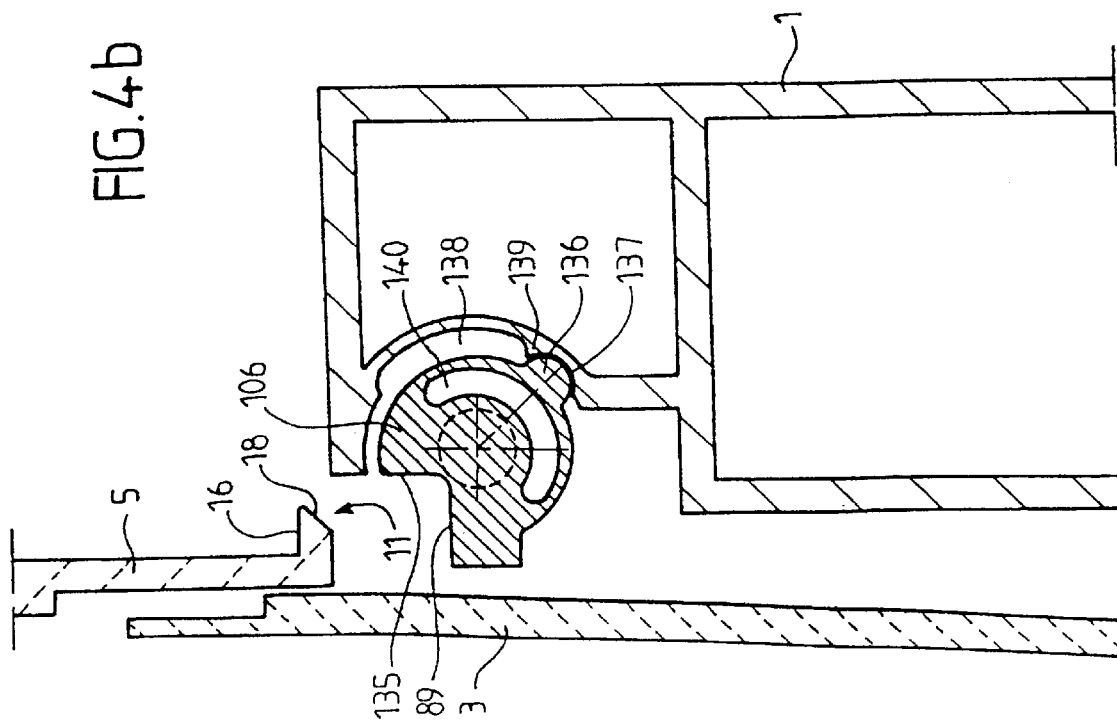

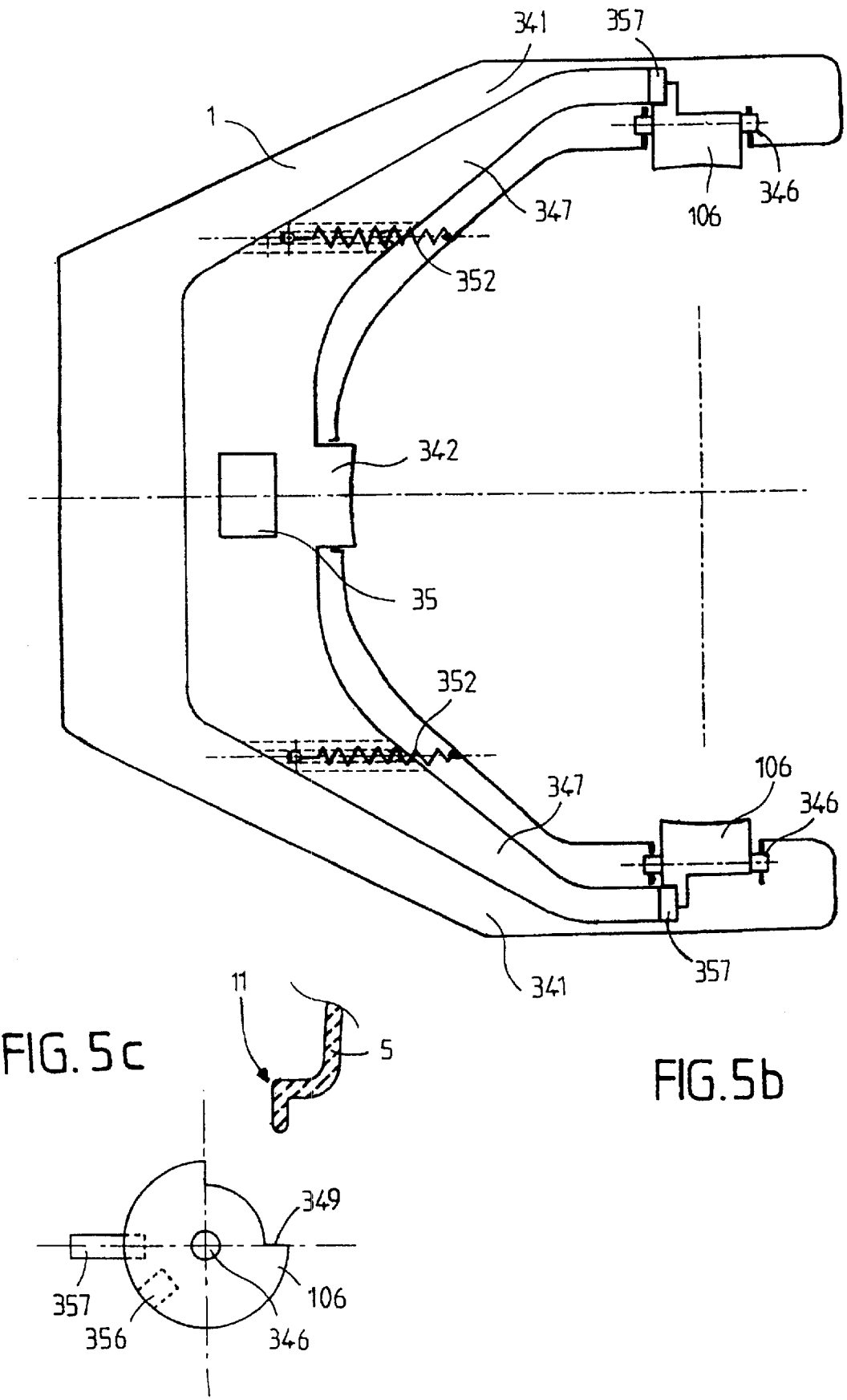

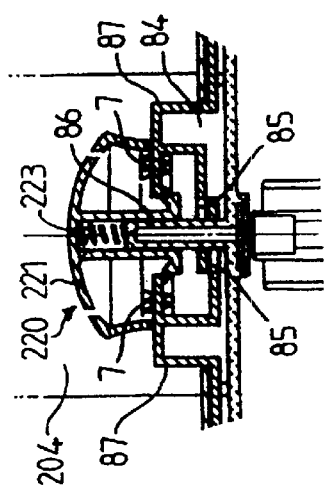
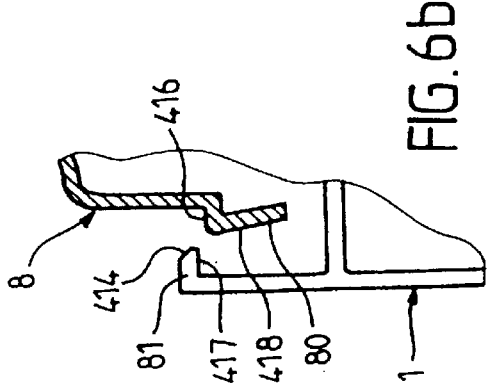
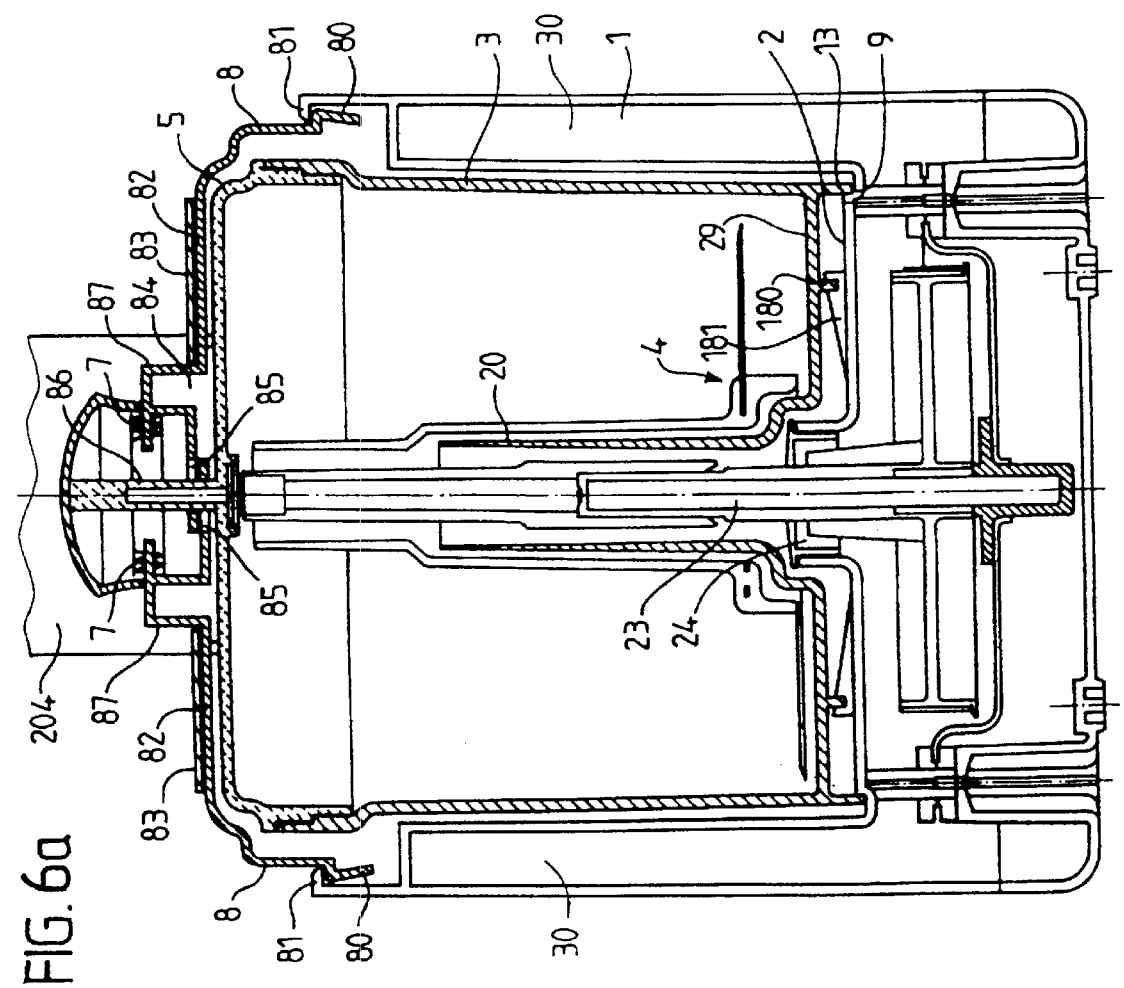

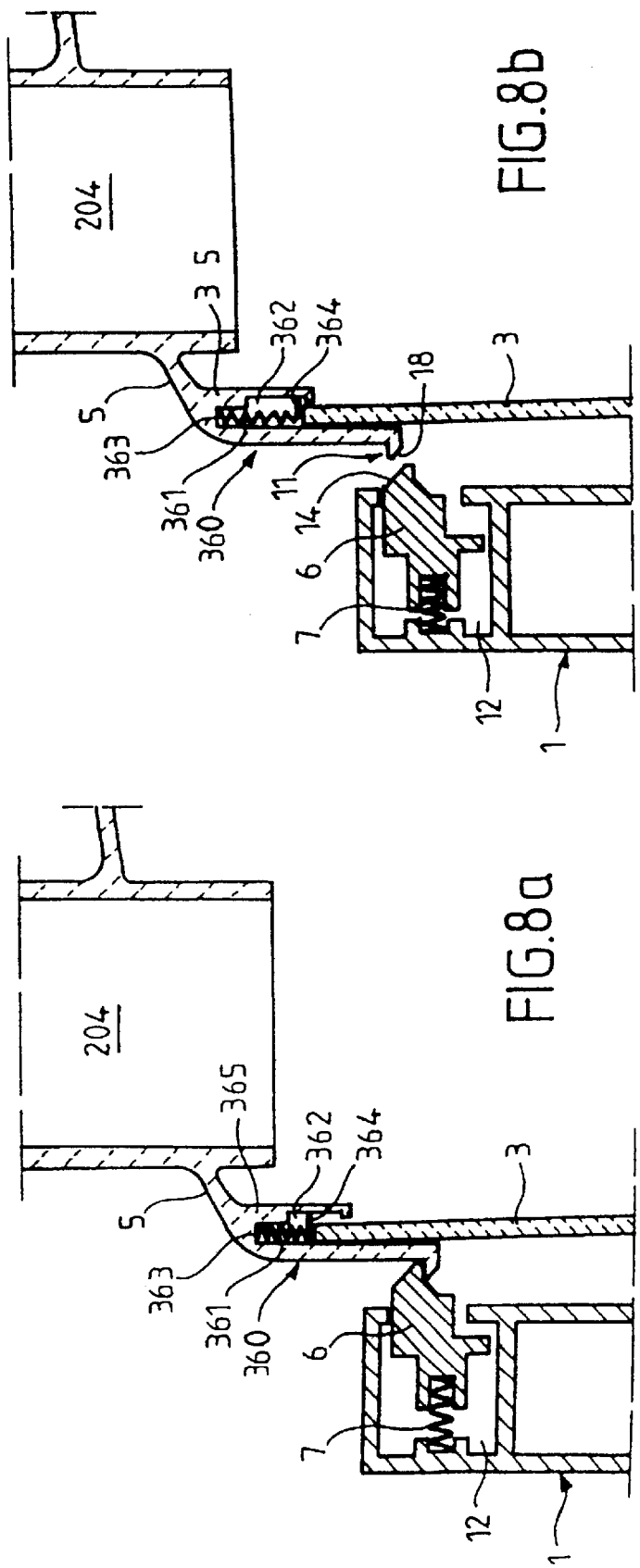

HOUSEHOLD ELECTRIC COOKING APPLIANCE, SUCH AS A FOOD PROCESSOR, COMPRISING A SIMPLIFIED LOCKING AND UNLOCKING DEVICE

This application is the national phase of international application PCT/FR98/02115 filed Oct. 2, 1998 which designated the U.S.

TECHNICAL FIELD

The present invention concerns an electrical household appliance for culinary preparation, of the food processor type, having a body comprising a motor block, a working receptacle provided to receive a rotatable working element driven by the motor block, as well as a lid capable of being locked onto the working receptacle.

By electrical household appliance for culinary preparation, of the food processor type, there is meant an appliance provided to produce chopped preparations, mixtures, or even grated or sliced preparations.

PRIOR ART

The document EP 0 549 818 describes an electrical household appliance for culinary preparation comprising a working receptacle locked onto a body by means of a bayonet attachment system, a lid locked onto the working receptacle by means of a bayonet attachment system, the lid having a tongue engaging in a slot of a housing forming a projecting part of the body to actuate a safety device which allows functioning of the appliance.

Such a construction permits the working receptacle to be maintained on the body during operation of the appliance and avoids mechanically urging the actuating tongue of the safety device, but presents the drawback of requiring that the user perform two locking movements associating each with a precise positioning of the receptacle with respect to the body, or of the lid with respect to the receptacle, followed by a rotation of the receptacle with respect to the body, or of the lid with respect to the receptacle. Such a construction also requires that the user hold the body of the appliance or the receptacle when he wished to remove the receptacle from the body of the appliance or even to unlock the lid from the receptacle. In addition, when the lid has a hollow shaft provided for introducing ingredients into the working receptacle, the position thereof is determined by the position of the lid which permits operation of the appliance. The user cannot choose the position of the lid.

The document FR 2 340 706 describes an electrical household appliance for culinary preparation having a base whose upper part constitutes a seat for receiving a removable accessory, such as a vegetable slicer, said accessory having a housing forming a working receptacle and a lid covering the housing. The lid is locked by means of two diametrically opposite bolts of the type called knuckle (joint), each having a hook of which the tip comes to engage with an ear of the base and which is articulated to the lid by the intermediary of a pivoting stirrup interposed between a boss of this lid and the extremity of the hook opposed to its tip. The motor is controlled by a switch whose operating element is situated on the upper part of the base and is actuated by means of a push button movably mounted on the hook of the lock, by the intermediary of a transmission mounted in the housing of the accessory.

This construction presents the drawback of providing an appliance having a working receptacle having transmission means serving to actuate the motor of the appliance. Cleaning of said receptacle is not facilitated by this arrangement. In addition, a precise positioning of the lid, of the working receptacle and of the base of the appliance is necessary to proceed with locking of the lid on the base.

The document FR 2 370 456 describes an electrical mixer having a working receptacle disposed on a base and closed by a lid, locking of the lid being assured by an operating lever pivoting around a horizontal axis and being applied by a movable bearing against a locking lever, which pivots around a fixed bearing and comes to bear against the lid. The fixed bearing can be moved freely through a determined distance in the axial direction. Starting from said fixed bearing, a control shaft guides a switch up to an actuating button of the circuit controlling the motor of the appliance.

Such a construction offers the advantage of providing an appliance in which the lid can be disposed on the working receptacle without a precise orientation, the working receptacle being able to be equally disposed without a precise orientation on the base. This construction presents, however, the drawback of controlling locking and unlocking by rotation of a lever around a horizontal axis, which presents a risk of throwing the appliance off balance during the operations of locking or of unlocking, if the appliance is not held sufficiently during operation of the lever. In addition, the utilization of a pivoting lever which comes to bear on the top of the lid in order to lock the cover on the body is difficult to envision for constructing an appliance in which grated or sliced preparations will be produced, the ingredients of which are introduced through a hollow shaft formed in the lid, and in which the lid can be positioned on the working receptacle over a large range of orientations.

SUMMARY OF THE INVENTION

The object of the invention aims consequently to provide a remedy to the different drawbacks enumerated previously and to furnish an electrical household appliance for culinary preparation which is particularly easy to use.

Another object of the invention aims to provide an electrical household appliance for culinary preparation which offers a great freedom of positioning of the lid with respect to the working receptacle.

Another object of the invention aims to provide an electrical household appliance for culinary preparation of which the unlocking can be effectuated with a single hand.

Another object of the invention aims to provide an electrical household appliance for culinary preparation which offers a great freedom of positioning of the working receptacle with respect to the base of the appliance.

The objects of the invention are achieved with the aid of an electrical household appliance for culinary preparation, of the food processor type having a body forming a base provided to receive a working receptacle in which can be disposed a rotatable working element driven by a motor disposed in the body, a lid provided to close the working receptacle, and means for locking the lid onto the working receptacle disposed on the base, in which the locking means have at least two jaws movably mounted on the body between a locking position in which they engage the lid to lock it vertically and an unlocking position in which the lid can be withdrawn, these jaws being movable against at least one restoring means toward one of the two positions, the appliance having unlocking means mounted for movement on the body between a rest position in which the jaws are capable of locking the lid on the receptacle, and an active position in which the jaws are brought into their unlocking position, or inversely, the jaws and the unlocking means being movably mounted on the lid and the jaws engaging with the body to lock the cover on the receptacle.

Thus, a user desiring to lock the lid on the working receptacle of the appliance simply places the lid on the working receptacle. Locking is obtained when the jaws take their locking position. No particular manipulation of the lid is necessary to obtain the locking. It results therefrom that the appliance according to the invention is particularly simple to use.

According to a first embodiment, the unlocking means and the jaws are mounted in the body, the jaws engaging with the lid.

According to a second embodiment, the unlocking means and the jaws belong to the lid, the jaws engaging with the body.

Advantageously, the jaws are mounted symmetrically with respect to the vertical axis passing through the center of gravity of the receptacle and of the lid.

This disposition permits an effective locking of the lid to be assured.

Advantageously, the lid and at least the top of the receptacle have a geometry of revolution.

This disposition permits creation of a locking device without indexing. The user does not have need to orient the lid in a precise position in order to obtain locking of said lid.

According to a principle of construction, the jaws are associated with elastic restoring means, the restoring position being the locking position.

According to another principle of construction, the jaws are associated with restoring means formed by an unbalanced mass or elastic restoring means, the restoring position being the unlocking position.

According to one form of construction, the unlocking means act against a restoring means.

Advantageously, the unlocking means are formed by an unlocking button having a path along an axis substantially parallel to the direction of introduction of the working receptacle onto the base, such a disposition permitting a displacement or an unbalancing of the appliance to be avoided during operation of the unlocking button.

The jaws can be mounted to be movable radially between their locking position and their unlocking position, or be mounted to be movable in rotation. Advantageously, the jaws are two in number.

According to a construction principle, the appliance has blocking means movable between a rest position in which the jaws are capable of locking the lid onto the receptacle under the action of the restoring means, and an active position in which the jaws occupy their unlocking position, as well as release means arranged to act on the blocking means to cause them to occupy their rest position.

This disposition has the advantage of permitting locking and unlocking by using only one hand.

According to another construction principle, the jaws have a beveled edge provided to cooperate with the lid or the body to push back the jaws in opposition to the restoring means during introduction of the lid onto the receptacle disposed on the base.

This disposition presents the advantage of permitting locking by a simple vertical movement of positioning the lid on the receptacle.

The working receptacle and the body can have lower rotation blocking means.

This disposition aids the blockage against rotation of the receptacle with respect to the body and prevents the receptacle from being driven in rotation by the material of the preparation, for example during preparation of dough.

Advantageously, the lower rotation blocking means are formed by corrugated annular ribs arranged under the bottom of the receptacle, said annular ribs being provided to cooperate with radial ribs formed on the base of the body.

The ribs combined with the locking means blocking the lid vertically with respect to the body are sufficient to obtain a blockage against rotation of the receptacle with respect to the body. Thus, the user does not need to lock the receptacle on the body. In addition, ribs corrugated in a periodic manner permit a positioning without precise indexing of the receptacle on the base.

Advantageously, the appliance has elastic means, mounted on the lid or the receptacle, said means being capable of being deformed when the lid is locked on the receptacle, and of raising the lid of the receptacle when the jaws are brought into the unlocking position.

This arrangement causes withdrawal of the lid to be easier.

BRIEF DESCRIPTION OF THE DRAWINGS

Other advantages and particularities of the invention will become more readily apparent with the aid of the description given below, in reference to the attached drawings which show by way of non-limiting examples, forms of construction of the object of the invention in which:

FIG. 1a shows a partial, front cross-sectional view of a first example of construction of a first embodiment of an electrical household appliance for culinary preparation according to the invention, the lid being lifted from the working receptacle, FIG. 1b shows a partial, front cross-sectional view of a detail of the first example of construction according to FIG. 1a, the lid being locked onto the working receptacle, FIG. 1d shows a partial, top cross-sectional view of the first example of construction according to FIG. 1a, the locking means being in the locking position, FIG. 1e shows a partial, rear cross-sectional view of a variant of the first example of construction of the first embodiment of an electrical household appliance for culinary preparation according to the invention, the locking means being in the locking position, FIG. 1f shows a partial, rear cross-sectional view of the variant according to FIG. 1a, the locking means being in the unlocking position, FIG. 1g shows a partial, top cross-sectional view of the variant according to FIG. 1e, the locking means being in the locking position, FIG. 2a shows a partial, top cross-sectional view of a second example of construction of a first embodiment of an electrical household appliance for culinary preparation according to the invention, FIG. 2b shows a partial, top cross-sectional view of a variant of a second example of construction of a first embodiment of an electrical household appliance for culinary preparation according to the invention, FIG. 3a shows a partial, top cross-sectional view of a third example of construction of a first embodiment of an electrical household appliance for culinary preparation according to the invention, FIG. 3b shows a partial, top cross-sectional view of a variant of a third example of construction of a first embodiment of an electrical household appliance for culinary preparation according to the invention, FIG. 4a shows a partial, top cross-sectional view of a fourth example of construction of a first embodiment of an electrical household appliance for culinary preparation according to the invention, FIG. 4b shows a partial, front cross-sectional view of the fourth example of construction according to FIG. 4a, in which the lid is lifted from the working receptacle, FIG. 4c shows a partial, front cross-sectional view of a detail of the fourth example of construction according to FIG. 4a, in which the lid is locked onto the working receptacle, FIG. 5b shows a top view of the fifth example of construction according to FIG. 5a in which a cover of the body of the appliance has been removed, FIG. 5c shows a partial, front cross-sectional view of a detail of the fifth example of construction according to FIG. 5a, in which the lid is lifted from the working receptacle, FIG. 7 is a partial, side cross-sectional view of a detail of one advantageous variant of construction of an electrical household appliance for culinary preparation according to the invention, FIGS. 8a and 8b are a partial, cross-sectional view of another advantageous variant of construction of an electrical household appliance for culinary preparation according to the invention.

BEST MANNER OF CARRYING OUT THE INVENTION

Figure 1C:
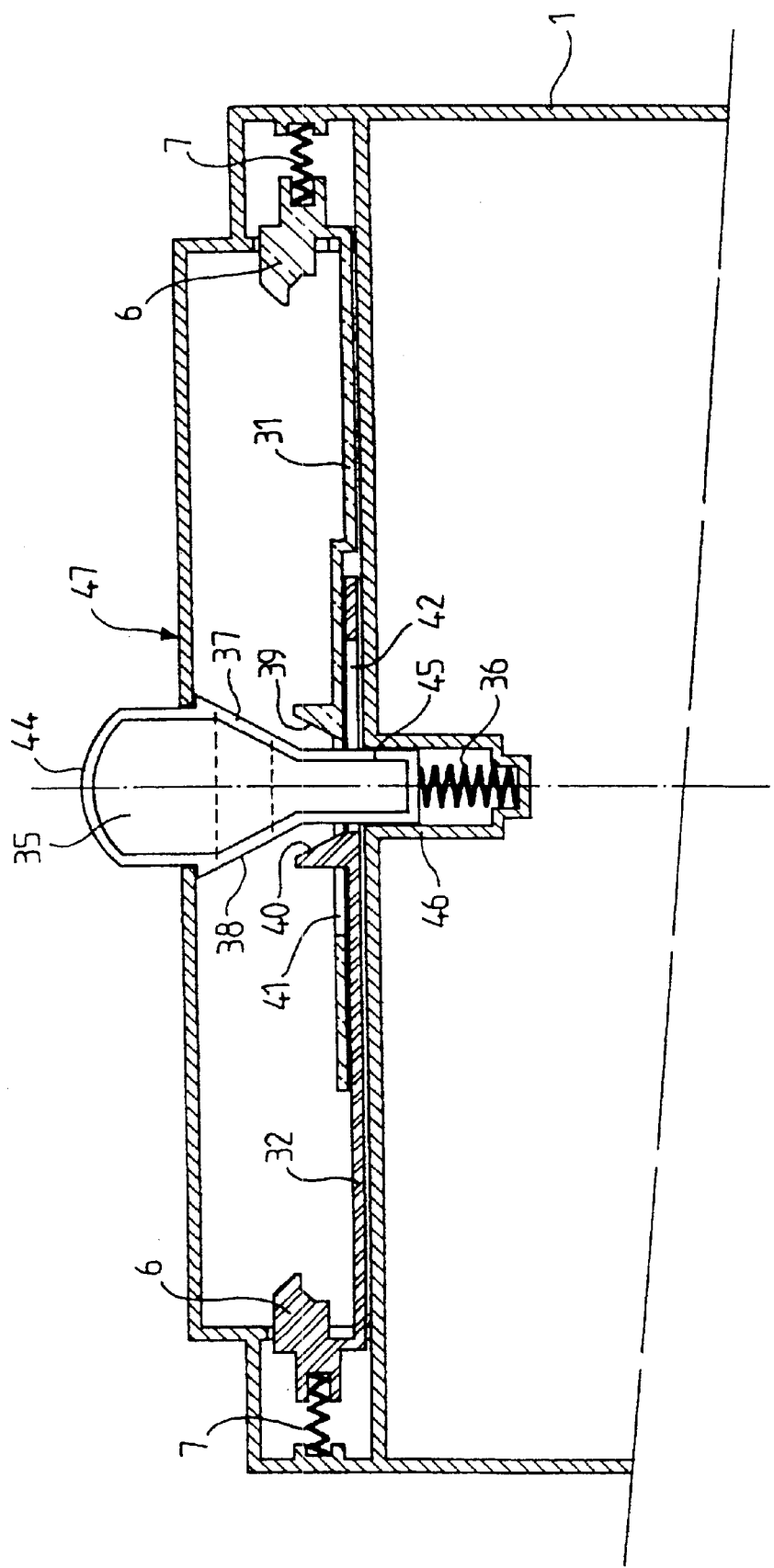
FIG. 1c shows a partial, rear cross-sectional view of the first form of construction according to FIG. 1a, the locking means being in the locking position.

The electrical household appliance for culinary preparation of the food processor type according to the invention represented in the figures has a body 1 forming a base 2 provided to receive a working receptacle 3 with an axis of symmetry x–x' in which can be disposed a rotatable working element 4 driven by a motor (not shown in the drawings) disposed in body 1.

The appliance also has a lid 5 provided to close working receptacle 3 and means for locking lid 5 on working receptacle 3 disposed on base 2. Lid 5 is advantageously furnished with a hollow shaft 204 provided for the introduction of ingredients during production of the preparation.

Working receptacle 3 advantageously has a handle 10 and a lower peripheral skirt 13 provided to cooperate with a rim 9 formed in base 2. Working receptacle 3 has lateral walls 28 and a bottom 29 in which is arranged a central hollow shaft 20 provided for the passage of means for driving working element 4.

Advantageously, working element 4 is composed of a hub 21 on which is mounted in a known manner a working tool 22, as shown in FIGS. 1a and 1b. Hub 21 cooperates with a rod 19 mounted in lid 5 to stabilize the rotation of working element 4.

Figure 6E:
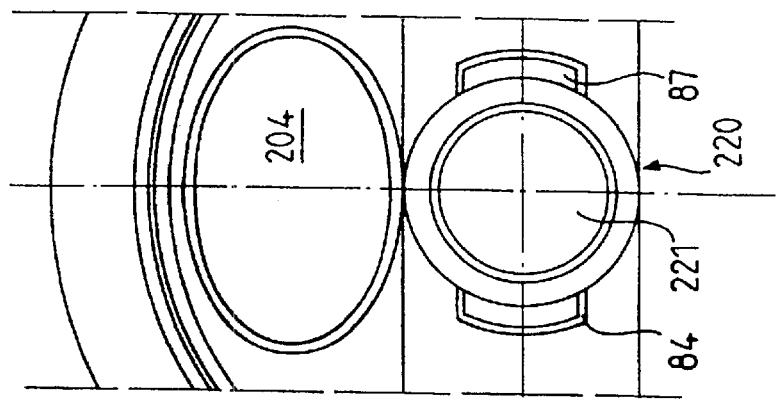
FIG. 6a shows a front cross-sectional view of a second embodiment of an electrical household appliance for culinary preparation according to the invention.
FIG. 6b shows a front cross-sectional view of a detail of the second embodiment according to FIG. 6a, FIG. 6c shows a top view of the second embodiment according to FIG. 6a, FIG. 6d shows a front cross-sectional view of a detail of a variant of the second embodiment according to FIG. 6a, FIG. 6e shows a top view of a detail of the variant according to FIG. 6d.
FIG. 6f shows a front cross-sectional view of the detail of the variant according to FIG. 6d, in which the unlocking means are in the rest position.
FIG. 6g shows a front cross-sectional view of the detail of the variant according to FIG. 6d, in which the unlocking means are blocked in the active position.
FIG. 6h shows a front cross-sectional view of the detail of the variant according to FIG. 6d, in which the release means is activated to return the unlocking means to the rest position.

The motor (not shown in the figures) disposed in body 1 of the appliance drives a transmission shaft 23, mounted opposite an opening 24 arranged in base 2, and on which is mounted working element 4, as shown in FIGS. 1a, 1b and 6a. Advantageously, the appliance includes safety means provided to allow operation of said appliance when lid 5 is correctly positioned on receptacle 3.

Advantageously, as shown in FIGS. 1a, 1b and 6a, working receptacle 3 and body 1 have lower rotation blocking means formed by corrugated annular ribs 180 provided at the outside of receptacle 3 under bottom 29, preferably in a periodic manner, for example sinusoidal with twelve bosses 182 and twelve hollows 183, said annular ribs 180 being provided to cooperate with radial ribs 181 formed in base 2 in order to position in a stable manner receptacle 3 on base 2 of body 1. In a preferred manner, the curvature of annular ribs 180 follows the curvature of radial ribs 181, as shown in FIG. 7, in a manner to aid rotation of receptacle 3 in order to occupy a stable position when the latter is disposed on base 2. By way of a variant, other lower rotation blocking means, such as a bayonet lock, can be envisioned.

According to the invention, the locking means have at least two jaws 6; 106; 8 mounted for movement against at least one restoring means 7 between a locking position and an unlocking position, and the appliance has unlocking means 35; 175; 87 mounted for movement between a rest position in which jaws 6; 106; 8 are able to lock lid 5 on receptacle 3, and an active position, in which jaws 6; 106; 8 occupy their unlocking position.

The locking means for lid 5 on body 1 have at least two jaws 6; 106; 8 mounted for movement in opposition to at least one restoring means 7 between a locking position, in which lid 5 is vertically blocked with respect to body 1, and an unlocking position, in which lid 5 can be withdrawn, jaws 6; 106; 8 being associated with unlocking means 35; 175; 87, mounted for movement between a rest position in which jaws 6; 106 are able to lock lid 5 on receptacle 3, and an active position, in which jaws 6; 106 occupy their unlocking position.

According to a first embodiment shown in FIGS. 1a to 5c, unlocking means 35; 175 of jaws 6; 106 are mounted in body 1, jaws 6; 106 engaging with lid 5.

According to a second embodiment shown in FIGS. 6a to 6h, unlocking means 87 and jaws 8 belong to lid 5, jaws 8 engaging with body 1.

Advantageously, unlocking means 35; 175; 87 act in opposition to an elastic restoring means 36; 7. Advantageously, each jaw 6; 106; 8 is associated with a restoring means 7. According to the examples of construction shown in FIGS. 1a to 4 and 5a to 5h, restoring means 7 is an elastic restoring means, the restoring position corresponding to the locking position of jaws 6; 106; 8.

According to a variant of construction of different examples of construction, the appliance has moreover blocking means movable between a rest position, in which jaws 6; 106; 8 are able to lock lid 5 on receptacle 3, and an active position, in which jaws 6; 106; 8 occupy their unlocking position, as well as release means able to act on the blocking means to cause them to occupy their rest position.

In a general manner, in order to lock the appliance, the user places working receptacle 3 on base 2, for example by gripping said receptacle by handle 10, then places working element 4 in receptacle 3. The user can also place working element 4 in receptacle 3 and then working receptacle 3 including working element 4 on base 2.

According to the first embodiment of the invention, jaws 6; 106 are mounted on body 1 of the appliance.

As shown in FIGS. 1a to 5c, jaws 6 are advantageously two in number and mounted diametrically opposite one another with respect to the axis of symmetry x–x' of receptacle 3 disposed on base 2.

According to a variant of construction, not shown in the figures, the appliance according to the invention has more than two jaws, for example two pairs of jaws 6 mounted in diametric opposition with respect to the axis of symmetry x–x' of receptacle 3 disposed on base 2, each pair of jaws 6 being constituted by two jaws disposed in proximity to one another. This arrangement permits a reduction in the volume of material of the jaws while assuring sufficiently spaced bearing points on the lid. Advantageously, the jaws are symmetrically mounted with respect to the vertical axis passing through the center of gravity of receptacle 3 and of lid 5. Thus, the resultant of the application forces of the jaws passes through the center of gravity.

FIGS. 1a to 1d show a first example of construction of the first embodiment of the invention.

As shown in FIG. 1a, lid 5 is lifted from working receptacle 3. As shown in FIG. 1b, lid 5 is locked onto receptacle 3 by jaws 6 pushed by restoring means 7.

Lid 5 has a peripheral skirt 15 having at least one rim 11 provided to cooperate with jaws 6. Advantageously, rim 11 is peripheral. This arrangement permits placement of lid 5 on working receptacle 3 without a preferential angular orientation. According to a variant of construction, not shown in the figures, at least one of rims 11 is formed by the lower wall of a cavity, opening or not, formed in the wall of skirt 15.

As shown in FIG. 1a, jaws 6 are mounted to be radially movable in housings 12 of body 1 from which they are able to emerge through openings 25. Each jaw 6 advantageously has an abutment 26 able to cooperate with a wall 27 of housing 12 in order to limit the travel of said jaw pushed back by restoring means 7.

As shown in FIG. 1a, housings 12 are arranged in uprights 30 which extend from base 2. By way of a variant, not shown in the figures, uprights 30 can be replaced by arms extending from a column that itself extends from base 2.

Each rim 11 has, in an advantageous manner, an upper plane 16 provided to cooperate with a lower plane 17 arranged on each of jaws 6. Advantageously, each rim 11 has a lower beveled edge 18 provided to push jaws 6 back against restoring means 7 during placement of lid 5 on working receptacle 3. Advantageously, each jaw 6 has an upper beveled edge 14 provided to facilitate sliding of rim 11 on said jaw during placement of lid 5 on working receptacle 3.

Each of the two jaws 6 is mounted on an arm 31, 32. As shown in FIG. 1d, the first arm 31 slides axially on the second arm 32. Each arm 31, 32 carries one of jaws 6. By way of a variant, each arm 31, 32 could carry several jaws 6.

The unlocking means comprise an unlocking button 35 mounted in body 1 against a restoring means 36. Unlocking button 35 has two camming surfaces 37, 38 able to push, respectively, a first camming surface 39 arranged on first arm 31 and a second camming surface 40 arranged on second arm 32, first arm 31 having an opening 41 provided for the passage of second camming surface 40 or of camming surface 38. Unlocking button 35 is movable against restoring means 36 between a rest position, in which jaws 6 are able to lock lid 5 on receptacle 3, and an active position corresponding to the restoring position, in which jaws 6 occupy their unlocking position and lid 5 can be withdrawn from receptacle 3.

Advantageously, unlocking button 35 has an activation surface 44 emerging on a face of body 1, second arm 32 equally having an opening 42 provided for the passage of a part 45 of button 35, for example for the purpose of guiding in a conduit 46 disposed with respect to arms 31, 32 opposite activation surface 44. In an advantageous manner, unlocking button 35 has a travel path along an axis substantially parallel to the direction of introduction of working receptacle 3 on base 2.

Advantageously, as shown in FIG. 1c, activation surface 44 is disposed on an upper face 47 of body I of the appliance, preferably at the interior of the perimeter determined by the bearing points of the appliance on a working support (not shown in the figures). This arrangement permits a great stability of the appliance when the user bears on activation surface 44 in order to bring jaws 6 into their unlocking position.

The operation of the first example of construction of the first embodiment is the following:

In order to lock the appliance, the user places, by a vertical movement, lid 5 on receptacle 3 in place on base 2.

When rim 11 of lid 5 has a lower beveled edge 18 and jaws 6 have an upper beveled edge 14, the user simply bears on lid 5 to push back jaws 6, arms 31, 32 sliding in one another. When lower plane 17 of jaws 6 has moved past upper plane 16 of rim 11, restoring means 7 lead jaws 6 onto rim 11 and lid 5 is locked.

When the contact of rim 11 with jaws 6 is not sufficient to push said jaws, the user must press on unlocking button 35 in order to separate arms 31, 32 carrying jaws 6 before placing lid 5 on receptacle 3.

In order to unlock the appliance, the user presses on unlocking button 35 with one hand. He can then withdraw with the other hand lid 5 from receptacle 3, or even receptacle 3 covered with lid 5 from base 2, for example by holding receptacle 3 by handle 10.

FIGS. 1e to 1g show a variant of construction of the first example of construction of the first embodiment of the invention, having blocking means and release means.

The blocking means are constituted by lugs 142 arranged on camming surfaces 37, 38 of unlocking button 35 and are provided to cooperate with cavities 143 provided on camming surfaces 39, 40 of arms 31, 32. Unlocking button 35 has another camming surface 144 provided to cooperate with the end 145 of a shaft 146 forming the release means. Shaft 146 is advantageously mounted to be movable against a spring 147 and comprises a head 148 accessible from outside body 1 to permit its manipulation by the user. FIG. 1e shows unlocking button 35 in its rest position, jaws 6 being in the unlocking position. FIG. 1f shows unlocking button 35 in the active position, blocked by lugs 143 forming the blocking means, camming surface 144 pushing back shaft 146 forming the release means.

The operation of this variant of construction has the following particularities:

In order to unlock the appliance, the user presses on unlocking button 35 in order to bring the unlocking means into the active position. The locking means are then blocked in the active position by the blocking means. Lugs 142 of button 35 brought into the active position are blocked in cavities 143 and maintain arms 31, 32 carrying jaws 6 separated. The blocking means maintaining jaws 6 in the unlocking position, the user can then withdraw lid 5 from receptacle 3 or receptacle 3 covered by lid 5 from base 2.

In order to lock the appliance, the user puts receptacle 3 and lid 5 in place, then pushes head 148 of shaft 146 forming the release means against body 1. End 145 cooperates with camming surface 144 to push button 35, causing escape of lugs 142 from cavities 143. Restoring means 7 push jaws 6 back against lid 5.

FIG. 2a shows a bottom view in cross-section of a second example of construction of the first embodiment of the invention. This example differs from the preceding example of construction in that arms 31, 32 are articulated, the operation remaining identical for the user. Each arm 31, 32 is mounted on a pivot 51, 52 and has a first member 53, 54 having a port 55, 56 cooperating with a lug 57, 58 mounted on each of jaws 6. Each arm 31, 32 equally has a second member 61, 62 having a port 63, 64 cooperating with a lug 65, 66 mounted on a slide 67, 68. The first slide 67 has the first camming surface 39 and the second slide has the second camming surface 40. The first slide 67 has an opening 41 provided for passage of the second camming surface 40 or of camming surface 38 of unlocking button 35.

FIG. 2b shows a variant of construction of the second example of construction of the first embodiment of the invention, having blocking means and release means. Cavities 143 are provided on camming surfaces 39, 40 of slides 67, 68. The operation for the user is identical to that of the preceding variant.

According to a third example of construction of the first embodiment of the invention, shown in FIG. 3a, the unlocking means comprise a rotatable unlocking button 175.

Unlocking button 175 has an eccentric surface 79 and is able to turn around a shaft 172. Slides 67 and 68 of the preceding example of construction are replaced by a rocker 70 having two ports 71, 72 cooperating with two lugs 75, 76 mounted respectively on each second member 61, 62 of arms 31, 32. Rocker 70 has a third port 73 perpendicular to the axis connecting the two preceding ports 71, 72, said port cooperating with a lug 77 fixed to body 1 of the appliance. Rocker 70 is mounted to be movable against a restoring means 74 and has a control surface 78 provided to cooperate with unlocking button 175. The protrusion 79 of unlocking button 175 is able to push control surface 78 back against restoring means 74, port 73 guiding rocker 70 by means of lug 77. Advantageously, unlocking button 175 cooperates with a restoring means, not shown in the figures.

The operation of the third example of construction of the first embodiment is similar to that of the first or of the second example of construction. The difference consists in the rotatable unlocking button 175.

FIG. 3b shows a variant of construction of the third example of construction of the first embodiment of the invention having blocking means and release means.

The blocking means are formed by a cavity 176, arranged on button 175, and able to cooperate with control surface 78 of rocker 70. The release means are formed by unlocking button 175.

The operation of this variant of construction has the following particularities:

In order to unlock the appliance, the user turns unlocking button 175 in order to bring the unlocking means into the active position. The locking means are then blocked in the active position by the blocking means. Rocker 70 blocked in cavity 176 of button 175 brought into the active position turns arms 31, 32 on which jaws 6 are mounted. The blocking means maintaining jaws 6 in the unlocking position, the user can then remove lid 5 from receptacle 3 or receptacle 3 covered with lid 5 from base 2.

In order to lock the appliance, the user puts receptacle 3 and lid 5 in place, then turns button 175 forming the release means. Restoring means 74 pushes rocker 70 and restoring means 7 push jaws 6 against lid 5.

FIGS. 4a, 4b and 4c show a fourth example of construction of the first embodiment of the invention, in which jaws 106 are two in number and are each mounted on a shaft 130 which is movable in rotation. As shown in FIG. 4a, each of shafts 130 comprises a toothed wheel 131 cooperating with a rack 132 disposed on slides 133, 134. Slides 133, 134 slide in one another and advantageously each have a camming surface 39, 40 provided to cooperate with a locking button such as that described in the first example of construction of the first embodiment of the invention. Restoring means 7 provided to lead jaws 106 into the locking position is disposed between slides 133 and 134.

FIGS. 4b and 4c show a partial cross-sectional view of one of jaws 106 mounted in body 1. Each jaw 106 has a plane 89 provided to cooperate with rim 11 of lid 5 during locking, and a plane 135 provided to cooperate with upper plane 16 of lid 3 in order to maintain lid 5 locked. Lower beveled edge 18 arranged on rim 11 of the lid advantageously facilitates rotation of jaws 106.

Advantageously, each jaw 106 has a boss 136 provided to turn in a free space 138 at the interior of which is arranged a protrusion 139 forming a hard point, thus permitting boss 136 to be blocked in a housing 137.

Boss 136 and protrusion 139 form a means for blocking jaws 106 in the unlocking position, such as shown in FIG. 4b, and permit the user to place lid 5 on body 3 or to withdraw lid 5 from body 3 without having to hold the unlocking button.

This blocking means is self-unblocking, the placement of lid 5 on receptacle 3 driving disengagement of boss 136 from protrusion 139 under the action of plane 16 on plane 135. FIGS. 4b and 4c show a partial annular cutout 140 extending along the length of one of jaws 106, aiding elastic deformation of said jaw at the level of boss 136 when the latter crosses protrusion 139.

The release means are formed by rim 11 of the lid able to cooperate with plane 89 of jaws 106.

The operation of the fourth example of construction of the first embodiment combines the advantages of the preceding examples of construction and of their variants.

To lock the appliance, the user places lid 5 on receptacle 3 in place on base 2. Contact of rim 11 of lid 5 with plane 89 of jaw 106 drives rotation of said jaw. Boss 136 being freed from protrusion 139, jaw 106 pivots under the action of restoring means 7 and plane 135 comes to rest on upper plane 16 of rim 11.

In order to unlock, the user bears on unlocking button 35. Slides 133, 134 move apart and cause pivoting of shafts 130 carrying jaws 106. Protrusion 139 then blocks boss 136. By this fact, jaws 106 remain blocked in the unlocking position.

The user can thus lock lid 5 simply by placing it on receptacle 3 and unlock the lid, then withdraw it while using only a single hand.

Figure 5A:
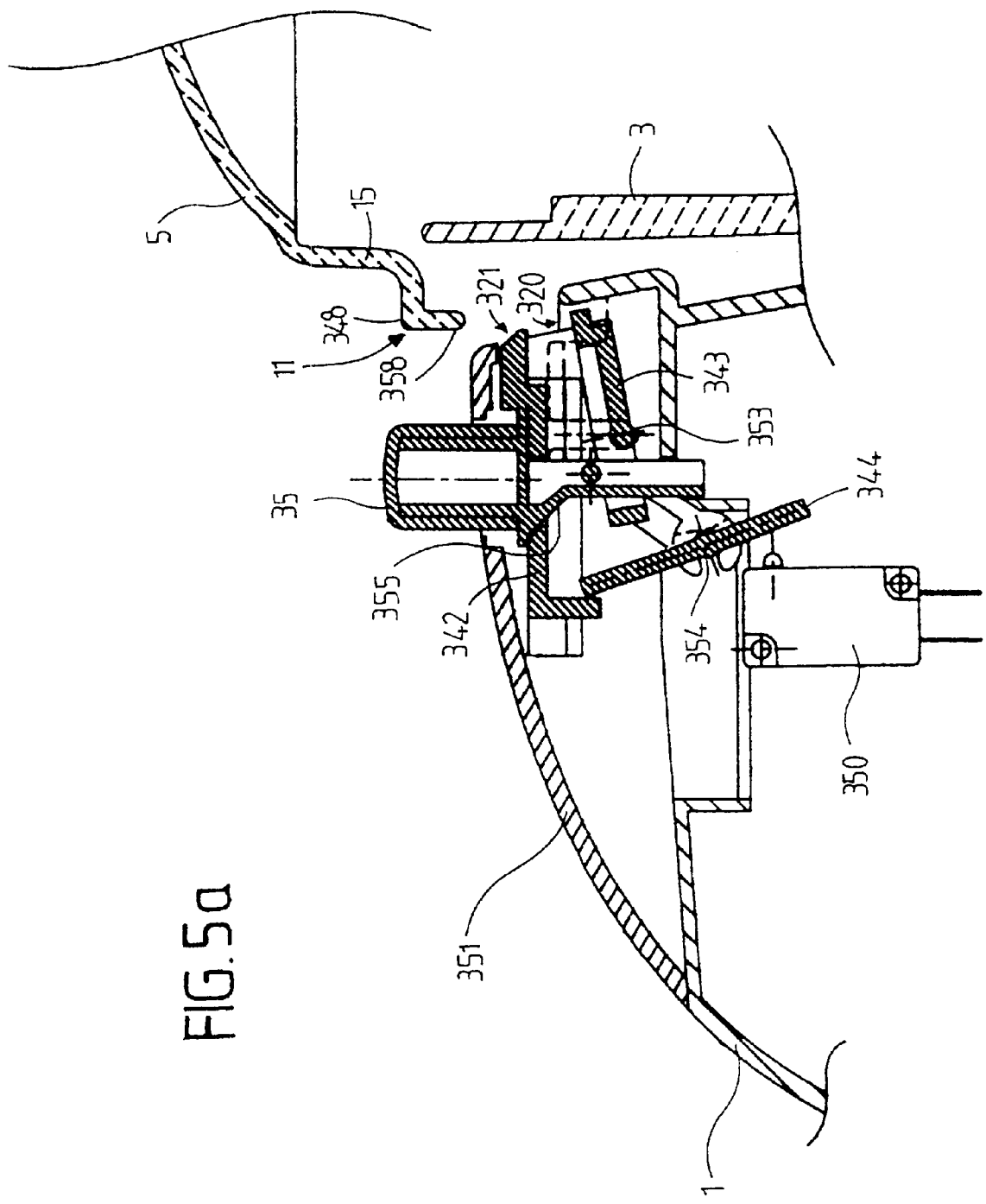
FIG. 5a shows a partial, lateral cross-sectional view of a fifth example of construction of the first embodiment of an electrical household appliance for culinary preparation according to the invention, in which the lid is lifted from the working receptacle.

According to a fifth example of construction of the first embodiment, shown in FIGS. 5a to 5c, the locking means have rotatable jaws 106 mounted in body 1 to be movable between a locking position and an unlocking position. The unlocking position constitutes the waiting position.

Jaw 106 shown in FIG. 5c is mounted to be movable in rotation on a shaft 346, and is shown in the waiting position. Jaw 106 has a notch 356 provided to receive one end 357 of a rod 347. Jaw 106 also has a cutout 349 provided to cooperate with rim 11 of lid 5.

As shown in FIG. 5b, body 1 has two arms 341 between which the working receptacle (not shown in the figure) can be disposed. On each of arms 341 is mounted the jaw 106 provided to lock lid 5 onto working receptacle 3. Jaws 106 are represented in their locking position. Each jaw 106 has a counterweight forming a restoring means tending to bring said jaw into its waiting position. By way of a variant, not shown in the figures, the restoring means can be an elastic restoring means.

An activation arm 342 mounted in body 1 is extended in each arm 341 by rod 347, the end 357 of which is able to cooperate with jaw 106. Springs 352 are provided to displace activation arm 342 into an exit position in a direction of the working receptacle. The activation arm belongs to safety device shown in FIG. 5a.

FIG. 5a shows in body I of the appliance a control means 320 of the safety device having a rocker 343 controlling a switch 350. Rocker 343 is pivotably mounted on a shaft 353. One end of rocker 343 is able to be actuated by rim 11 of lid 5. Lid 5 includes a skirt 15 having a shoulder 348 and is terminated by an end 358 forming rim 11. The opposed end of rocker 343 has a housing in which a shaft 354 of a control element 344 pivots.

Activation arm 342 is mounted in body 1 for movement between a retracted position in which lid 5 can be placed on working receptacle 3 represented in FIG. 5a, and an exit position in which one end of activation arm 342 comes to partially cover shoulder 348 of lid 5. One end of control element 344 is provided to actuate the button of microswitch 350 while the other end cooperates with the activation arm.

The safety device is associated with means for locking lid 5 on receptacle 3 formed by jaws 106. An unlocking button 35 of the locking means is mounted in body 1 to be movable between a depressed position for unlocking in which the lid can be placed or withdrawn and a raised position in which the lid is locked onto the working receptacle. In FIG. 5a, the activation arm is in the retracted position and the unlocking button is represented in the unlocking position. Button 35 has a camming surface 355 able to be actuated by activation arm 342. A cover 351 mounted on body 1 covers the elements of the locking device.

The operation of this fifth example of construction is the following.

When lid 5 is withdrawn from receptacle 3, jaws 106 occupy their waiting position.

When lid 5 is in place on receptacle 3, rim 11 actuates at the same time rocker 343 and jaws 106. Rocker 343 pivots on shaft 353 and approaches control element 344 of microswitch 350. Jaws 106 pivot on shafts 346 and ends 357 of rods 347 of activation arm 342 enter into notches 356. Jaws 106 are then locked in the locking position. Under the action of springs 352, activation arm 342 assumes its exit position, a position in which it comes to partially cover shoulder 348 of lid 5. During this displacement, activation arm 342 drives the upward movement of unlocking button 35 into the locking position by the intermediary of cam 355, and actuates control element 344 which comes to control microswitch 350.

In order to unlock, the user presses on unlocking button 35, which pushes activation arm 342 which then frees jaws 106. The user can withdraw lid 5 from receptacle 3. When lid 5 is withdrawn, jaws 106 assume their waiting position.

According to a second embodiment of the invention, jaws 8 are mounted on lid 5 of the appliance.

Figure 6C:
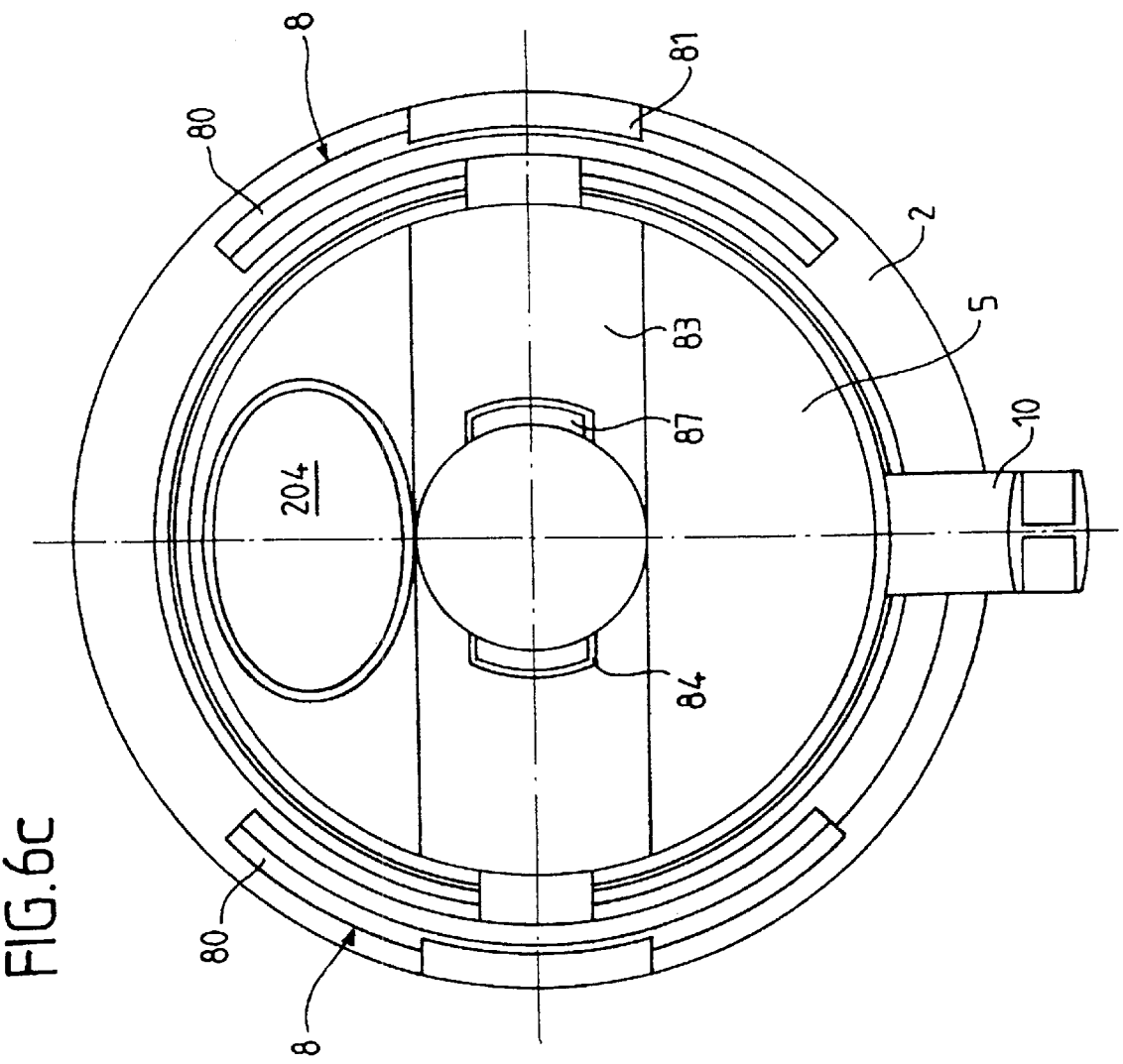
Figure 6F:
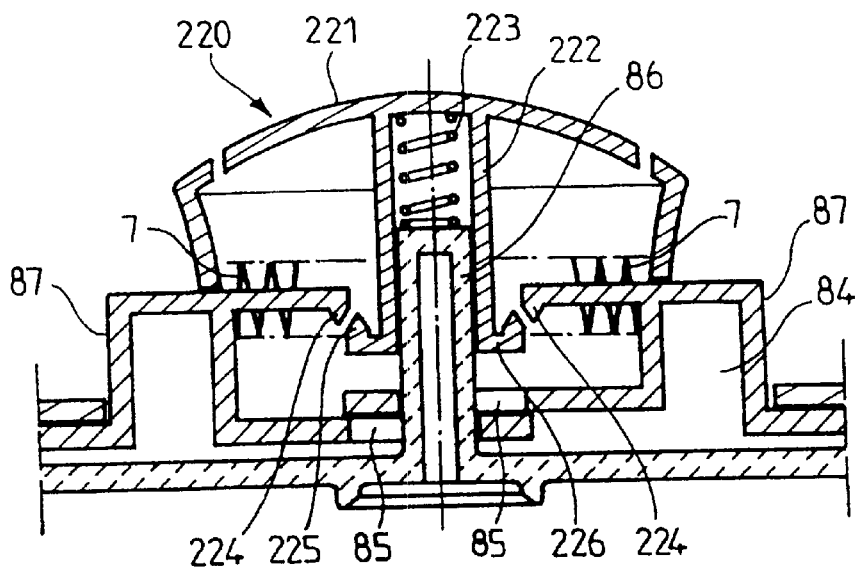
Figure 6G:
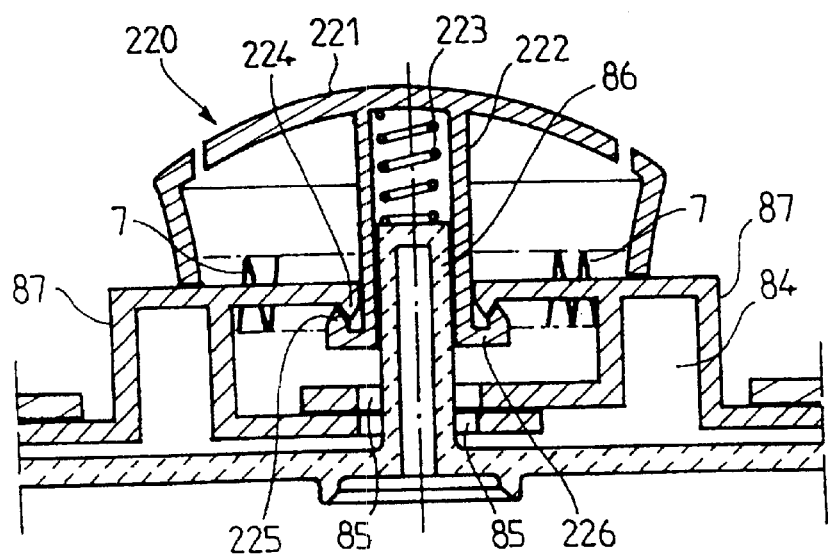

According to an example of construction shown in FIGS. 6a to 6c, jaws 8 are advantageously two in number and mounted diametrically opposite one another with respect to an axis of symmetry x–x' of receptacle 3 disposed on base 2, each against a restoring means 7. Each jaw 8 is extended by a peripheral edge 80 provided to cooperate with a peripheral rim 81 disposed on body 1 of the appliance.

Advantageously as shown in FIG. 6c, body 1 has two diametrically opposed rims 81 and edges 80 of jaws 8 have an angular opening which is larger than rims 81 of body 1 of the appliance.

As shown in FIG. 6a, rims 81 are arranged on uprights 30 coming from base 2. By way of a variant, not shown in the figures, uprights 30 can be replaced by arms coming from a column itself coming from base 2.

As shown in FIG. 6b, each peripheral edge 80 of jaw 8 has in an advantageous manner an upper plane 416 provided to cooperate with a lower plane 417 arranged on rims 81 of body 1.

Advantageously, each rim 80 of jaw 8 has a lower beveled edge 418 provided to push jaw 8 against restoring means 7 during placement of lid 5 on working receptacle 3 disposed on base 2 opposite rims 81 of body 1.

Advantageously, each rim 81 of body 1 has an upper beveled edge 414 provided to facilitate sliding of rim 80 of jaw 8 on rim 81 of body 1 during placement of lid 5 on working receptacle 3 disposed on base 2 opposite rims 81 of body 1.

Each jaw 8, mounted for radial movement, is in an advantageous manner prolonged by an arm 82 slidably mounted under a plate 83, said arm 82 having a guiding port 85 cooperating with a lug 86 fixed to lid 5. Plate 83 has an opening 84 through which each of arms 82 presents a projecting upright 87. The two uprights 87 form the unlocking means. The rest position of uprights 87 corresponds to the locking position of jaws 8 and the active position of uprights 87 corresponds to the unlocking position of jaws 8.

According to a variant of construction of the second embodiment, not shown in the figures, peripheral rim 81 occupies the entire periphery of body 1 of the appliance. According to another variant of construction, equally not shown in the figures, more than two jaws 8, for example four, are mounted on lid 5.

The operation of the example of construction of the second embodiment is the following:

In order to lock the appliance, the user disposes, by a vertical movement, lid 5 on receptacle 3 positioned on base 2.

When peripheral edge 80 of jaws 8 has a lower beveled edge 418 and peripheral rim 81 of body I has an upper beveled edge 414, the user places lid 5 on receptacle 3, the jaws 8 being opposite rims 81 in the case where rims 81 do not occupy the entire periphery of body 1. When upper plane 416 of jaws 8 has moved past lower plane 417 of rim 81, restoring means 7 lead jaws 8 under rim 81 and lid 5 is locked.

When the contact of rim 81 with jaws 8 is not sufficient to push back said jaws, the user must bear on uprights 87 forming the unlocking means in order to separate jaws 8 before placing lid 5 on receptacle 3.

In order to unlock the appliance, the user moves the two uprights 87 together, which separates jaws 8 from rims 81. The user can then withdraw lid 5 from receptacle 3 by holding the lid by uprights 87, or withdraw receptacle 3 covered with lid 5, by taking lid 5 by uprights 87 in one hand and receptacle 3 by handle 10 in the other hand.

FIGS. 6d to 6h show a variant of construction of the example of construction of the second embodiment of the invention, having blocking means and release means.

The blocking means are formed by lugs 224 provided on arms 82, able to cooperate with raised parts 225 provided on a ring 226 of a pushbutton 220 mounted on lid 5. Advantageously, as shown in FIG. 6d, pushbutton 220 forms an element for gripping the lid.

Figure 6H:
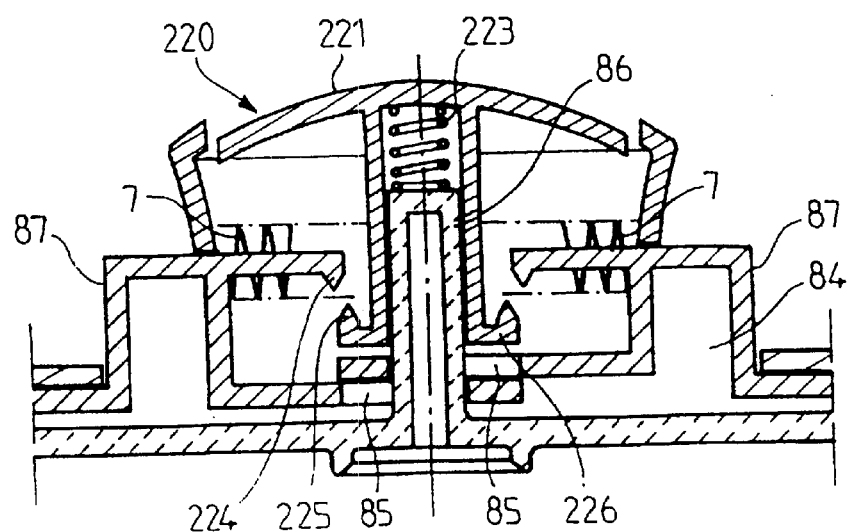

Pushbutton 220 forms the release means. Pushbutton 220 has an activation surface 221 movable against a spring 223 between a raised position in which lugs 224 are able to come to engage with raised parts 225, and a depressed position in which raised parts 225 free lugs 224 and thus arms 82 pushed back by restoring means 7. Advantageously, activation surface 221 is disposed substantially at the top of lid 5, so that the user holding lid 5 by pushbutton 220 can press with the same motion on surface 221. FIG. 6h shows the activation surface in the depressed position.

The operation of this variant of construction has the following particularities:

To unlock the appliance, the user moves the two uprights 87 toward one another, which separates jaws 8 from rims 81. Uprights 87 brought into the active position are blocked by lugs 224 cooperating with raised parts 225. The blocking means maintaining jaws 8 in the unlocking position, the user can then withdraw lid 5 from receptacle 3 or receptacle 3 with lid 5 thereon from base 2.

To lock the appliance the user puts lid 5 in place on receptacle 3, with jaws 8 opposite rims 81 on body 1, by maintaining for example lid 5 by button 220. Advantageously, in the same movement when lid 5 is in place on receptacle 3, the user presses on activation surface 221. Raised parts 225 free lugs 224 and the restoring means push back jaws 8 against body 1. The user can equally proceed in two steps: first of all put lid 5 in place, then press on activation surface 221.

Advantageously, the apparatus includes a lifting device 360 for lid 5, constituted by elastic means able to be deformed when lid 5 is locked onto receptacle 3, and able to raise lid 5 of receptacle 3 when the jaws are brought into the unlocking position.

According to the embodiment shown in FIGS. 8a and 8b, jaws 6 are mounted on body 1 and the elastic means are constituted by a plurality of springs 361, only one of which is shown in the figures, said springs being mounted in lid 5, and their free end 364 being able to slide in a groove 362 arranged in a wall 365 of lid 5. Advantageously, springs 361 are at least three in number. FIG. 8a shows lid 5 locked onto receptacle 3 by means of jaws 6, only one of which is shown.

Springs 361 mounted in a housing 363 of lid 5 are compressed by receptacle 3. FIG. 8b shows lid 5 unlocked, jaws 6, only one of which is shown, being in the unlocking position. Springs 361 lift lid 5 from receptacle 3.

Advantageously, the elastic means is able to lift lid 5 so that the jaws reassuming their locking position are not able to lock lid 5 on receptacle 3. As shown in FIG. 8b, upper beveled edge 14 of jaws 6 is able to push back lower beveled edge 18 of rim 11 of lid 5 lifted from receptacle 3. Other dispositions can be envisioned. By way of example, the elastic means could lift rim 11 above jaws 6.

By way of a variant, lifting device 360 can include elastic means other than spring 361, for example a ring of elastomer. By way of a variant also, the elastic means can be mounted on receptacle 3, even on body 1. By way of a further variant, the jaws can be rotatable jaws 106, or jaws 8 mounted on lid 5.

Advantageously, the elastic means of lifting device 360 for lid 5 lift lid 5 of receptacle 3. Advantageously also, the elastic means lift lid 5 so that the jaws reassuming their locking position are not able to lock lid 5 on receptacle 3. The user can thus actuate the unlocking means with one hand, then withdraw, advantageously with the same hand, lid 5 resting on the jaws.

The invention is not in any way strictly limited to the examples of construction described previously, but encompasses numerous modifications and improvements.

Notably, by way of complementary examples, it is possible to envision rotatable jaws mounted on the lid or even rotatable jaws associated with a rotatable unlocking button, the two arrangements being able to be associated.

The arms carrying the jaws of the first and second examples of construction of the first embodiment can be replaced by arms movable in rotation around a substantially vertical axis.

The invention can also be applied to an appliance having a receptacle and a lid of which the geometry is not a geometry of revolution, or to a receptacle and a lid of which the parts opposite one another do not have an axis of symmetry and require an indexing of the lid on the receptacle according to a given position.

The invention can also be applied to an appliance having a receptacle and a lid of which the parts opposite one another have an axis of symmetry, the body of the receptacle not being of a geometry of revolution, such an appliance permitting a freedom of positioning in rotation of the lid on the receptacle during introduction of the lid onto the receptacle.

The freedom of positioning in rotation can be total (over 360°), partial (over one or several angular sectors) or multiple (along to several positions).

The invention can equally be applied to an appliance having a receptacle or a lid positioned on the receptacle by a uniaxial movement along an inclined axis, distinct from the vertical axis.

It is equally possible to replace the central hollow shaft by a sealed passage through the wall permitting the transmission of movement to the tool, such as known on electrical household appliances of the mixer types, provided for producing liquid preparations.

POSSIBILITIES OF INDUSTRIAL APPLICATION

The invention finds its application in the general technical field of electrical household appliances for culinary preparation, of the multi-use food processor type.

What is claimed is:

1. Electrical household appliance for culinary preparation, of the food processor type having a body (1) forming a base (2) provided to receive a working receptacle (3) in which can be disposed a rotatable working element (4) driven by a motor disposed in the body (1), a lid (5) provided to close the working receptacle (3)1 and means for locking the lid (5) on the working receptacle (3) disposed on the base (2), characterized in that:

the locking means have at least two jaws (6; 106) movably mounted on the body (1) between a locking position in which they engage the lid (5) to block it vertically and an unlocking position in which the lid (5) can be withdrawn, these jaws being movable against at least one restoring means (7) toward one of the two positions, and in that the appliance has unlocking means (35; 175) movably mounted on the body between a rest position in which the jaws (6; 106) are able to lock the lid (5) on the receptacle (3), and an active position in which the jaws (6; 106) are brought into their unlocking position.

2. Appliance according to claim 1, characterized in that the jaws (6; 106; 8) are mounted symmetrically with respect to the vertical axis passing through the center of gravity of the receptacle (3) and of the lid (5).

3. Appliance according to claim 1, characterized in that the lid (5) and at least the top of the receptacle (3) have a geometry of revolution.

4. Appliance according to claim 1, characterized in that the jaws (6; 106; 8) are associated with elastic restoring means (7), the restoring position being the locking position.

5. Appliance according to claim 4, characterized in that the unlocking means are formed by an unlocking button (35) mounted against the restoring means (36), said button having two camming surfaces (37, 38) able to push back respectively a first camming surface (39) provided on the first arm (31) and a second camming surface (40) provided on the second arm (32).

6. Appliance according to claim 4, characterized in that it has blocking means (142; 176; 136; 224) movable between a rest position in which the jaws (6; 106; 8) are able to lock the lid (5) on the receptacle (3) under the action of restoring means (7), and an active position in which the jaws (6; 106; 8) occupy their unlocking position, as well as release means (146; 175; 11; 220), arranged to act on the blocking means (142; 176; 136; 224) in order to cause them to occupy their rest position.

7. Appliance according to claim 4, characterized in that the jaws (6; 8) have a beveled edge (14; 80) provided to cooperate with the lid (5) or the body (1) in order to push back the jaws (6; 8) against the restoring means (7) during introduction of the lid (5) on the receptacle (3) disposed on the base (2).

8. Appliance according to claim 1, further comprising restoring means associated with the jaws (106), said restoring means being formed by a counterweight or elastic restoring means, and said restoring means being operative to urge the jaws toward the unlocking position.

9. Appliance according to claim 8, characterized in that it comprises a locking arm (342) mounted in the body (1) movable against springs (352), said locking aim being provided to block in the locking position the jaws (106) each mounted on one of the shafts (346), said locking arm being able to be manipulated by an unlocking button (35) in order to free said jaws.

10. Appliance according to claim 1, characterized in that the unlocking means (35; 175; 87) act against a restoring means (36; 7; 352).

11. Appliance according to claim 1, characterized in that the unlocking means are formed by an unlocking button (35) having a travel path along an axis substantially parallel to the direction of introduction of the working receptacle (3) on the base (2).

12. Appliance according to claim 1, characterized in that the unlocking means comprise a rotatable unlocking button (175).

13. Appliance according to claim 1, characterized in that the jaws (6; 8) are mounted for movement radially between their locking position and their unlocking position.

14. Appliance according to claim 1, characterized in that it has two arms (31, 32) each carrying at least one jaw (6).

15. Appliance according to claim 1, characterized in that it has two jaws (106) each mounted on a shaft (130; 346) movable in rotation.

16. Appliance according to claim 15, characterized in that each of the shafts (130) comprises a toothed wheel (131) cooperating with a rack (132) disposed on a slide (133, 134), the slides (133, 134) sliding in one another and each having a camming service (39, 40) provided to cooperate with an unlocking button (35), mounted against the restoring means (36), said button forming the unlocking means.

17. Appliance according to claim 1, characterized in that the lid (5) has two jaws (8) mounted diametrically in opposition to the working receptacle (3) disposed on the base (2), each jaw (8) being extended by a peripheral edge (80) extending beyond the working receptacle (3) and provided to cooperate with a peripheral rim (81) disposed on the body (1) of the appliance, each jaw (8) being extended by an arm (82) slidably mounted under a plate (83), said arm (82) having a guide port (85) cooperating with a lug (86) fixed to the lid (5), the plate (83) having an opening (84) through which each of the arms (82) has a protruding upright (87), the two uprights (87) forming the unlocking means.

18. Appliance according to claim 1, characterized in that the working receptacle (3) and the body (1) have lower rotation blocking means.

19. Appliance according to claim 1, characterized in that the lower rotation blocking means are formed by corrugated annular ribs (180) provided under a bottom (28) of the receptacle (3), said annular ribs (180) being provided to cooperate with radial ribs (181) formed on the base (2) of the body (1).

20. Appliance according to claim 1, characterized in that it comprises elastic means mounted on the lid (5) or the receptacle (3), said elastic means being able to be deformed when the lid (5) is locked on the receptacle (3), and being able to lift the lid (5) from the receptacle (3) when the jaws (6; 106; 8) are brought into the unlocking position.

* * * * *